(12) United States Patent
Kuwahara et al.

(10) Patent No.: US 7,890,237 B2
(45) Date of Patent: Feb. 15, 2011

(54) CONTROL DEVICE AND METHOD OF VEHICLE

(75) Inventors: Seiji Kuwahara, Toyota (JP); Masato Kaigawa, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 907 days.

(21) Appl. No.: 11/713,693

(22) Filed: Mar. 5, 2007

(65) Prior Publication Data

US 2007/0213175 A1 Sep. 13, 2007

(30) Foreign Application Priority Data

Mar. 7, 2006 (JP) ............................. 2006-061902

(51) Int. Cl.
*G06F 17/00* (2006.01)

(52) U.S. Cl. .................. 701/51; 477/169; 477/174; 74/335

(58) Field of Classification Search ............... 477/34, 477/52, 53, 62, 166, 174, 169; 701/1, 51, 701/55, 56, 67, 68, 29, 48, 54, 70; 475/231; 74/335
See application file for complete search history.

(56) References Cited

U.S. PATENT DOCUMENTS

| 4,449,618 | A | * | 5/1984 | Suga et al. ................. 192/3.31 |
| 4,589,071 | A | * | 5/1986 | Yamamuro et al. ............ 701/55 |
| 4,618,041 | A | * | 10/1986 | Sotoyama et al. .............. 477/62 |
| 4,753,135 | A | * | 6/1988 | Sotoyama et al. .............. 477/65 |
| 6,217,469 | B1 | * | 4/2001 | Sawada et al. ................ 474/28 |
| 2003/0216848 | A1 | * | 11/2003 | Katrak et al. ................. 701/54 |
| 2004/0097328 | A1 | * | 5/2004 | Makiyama et al. ............ 477/43 |
| 2004/0127331 | A1 | * | 7/2004 | Sawada et al. ................ 477/44 |
| 2004/0157705 | A1 | * | 8/2004 | Nobumoto et al. .......... 477/174 |

FOREIGN PATENT DOCUMENTS

| DE | 36 25 156 A1 | 2/1987 |
| DE | 197 15 908 A1 | 11/1997 |
| JP | 8-280079 A | 10/1996 |
| JP | 2005-178626 A | 7/2005 |

\* cited by examiner

*Primary Examiner*—Khoi Tran
*Assistant Examiner*—Stephen Holwerda
(74) *Attorney, Agent, or Firm*—Sughrue Mion, PLLC

(57) ABSTRACT

A control device of a vehicle which switches a lockup clutch to an operating state depending upon vehicle conditions determines switching of the lockup clutch from lockup-ON switching lines established when the lockup clutch is in an engaged state, or from lockup-OFF switching lines established when the lockup clutch is in a released state. When switching of the lockup clutch is determined based on one of the lockup-ON switching lines and the lockup-OFF switching lines, a determination based on the other switching lines is selected as an effective determination about switching once the same switching of the operating state as that determined based on the above-indicated one of the switching lines is determined based on the other switching lines.

19 Claims, 18 Drawing Sheets

CONTROL DEVICE AND METHOD OF VEHICLE

INCORPORATION BY REFERENCE

The disclosure of Japanese Patent Application No. 2006-061902 filed on Mar. 7, 2006, including the specification, drawings and abstract, is incorporated herein by reference in its entirety.

BACKGROUND OF THE INVENTION

1. Field of the Invention

The invention generally relates to control device and method of a vehicle including a lockup clutch capable of directly coupling the input and output of a hydraulic power transmitting device disposed in a power transmission path that extends from a power source, such as an engine, to driving wheels. In particular, the invention is concerned with switching control of the operating state of the lockup clutch.

2. Description of Related Art

There is known a control device of a vehicle including a lockup clutch capable of directly coupling the input and output of a hydraulic power transmitting device disposed in a power transmission path that extends from a power source, such as an engine, to driving wheels. The known control device is adapted to control the lockup clutch so that the lockup clutch is switched to an operating state that is determined from predetermined switching lines based on vehicle conditions.

An example of the control device of the vehicle as described above is disclosed in JP-A-9-280079. The vehicle disclosed in this publication includes a lockup clutch that directly couples the input and output elements, i.e., a pump impeller and a turbine wheel, of a torque converter that receives torque from the engine. The control device is adapted to switch the lockup clutch to an operating state that is determined based on vehicle conditions represented by the actual vehicle speed and the throttle opening, from a lockup region diagram having a boundary or boundaries of an engagement region and a release region of the lockup clutch, which boundary is determined in advance with respect to the vehicle speed and the throttle opening that represents an engine load as variables.

In the meantime, JP-A-2005-178626 discloses a vehicular integrated control system that controls a plurality of control systems for controlling a drive system, a braking system and a steering system, respectively, in an integrated manner. For example, the integrated control system harmonizes the required driving force calculated from the accelerator pedal travel or stroke as an amount of operation of the accelerator pedal by the driver, and the required driving force for controlling the driving force outputted from a driving assist system, such as a so-called cruise control system, for automatically controlling the vehicle speed irrespective of the accelerator pedal travel so as to achieve a target vehicle speed set by the driver. On the basis of the result of harmonization, the integrated control system produces command values to respective actuators for controlling the engine torque, change gear ratio of the transmission, and so forth.

When the integrated control as disclosed in JP-A-2005-178626 is performed, it is desirable to determine switching of the operating state of the lockup clutch based on the required driving force, so that control for switching the operating state of the lockup clutch is consistent with controls of the respective control systems. In this case, switching of the operating state of the lockup clutch may be determined from the above-mentioned lockup region diagram, based on the actual vehicle speed and the throttle opening into which the required driving force is converted, or may be determined based on the actual vehicle speed and the required driving force, from a lockup region diagram having the vehicle speed and the driving force as variables, into which the predetermined lockup region diagram having the vehicle speed and the throttle opening as variables is converted.

However, since the torque ratio t (i.e., turbine torque (output-side torque)/the pump torque (input-side torque)) of the torque converter changes depending upon the operating state of the lockup clutch, the required throttle opening (or the required engine torque) derived from the required driving force changes upon switching of the operating state of the lockup clutch even if the required driving force is constant. Namely, a vehicle condition based on which switching of the operating state of the lockup clutch is determined from the lockup region diagram changes with the operating state of the lockup clutch even if the required driving force is constant. As a result, a lockup ON determination (i.e., a determination that the lockup clutch should be switched ON) based on a lockup ON line used for determining switching of the lockup clutch from the released state to the engaged state and a lockup OFF determination (i.e., a determination that the lockup clutch should be switched OFF) based on a lockup OFF line used for determining switching from the engaged state to the released state are repeated in an alternating manner, thus giving rise to a possibility of switching control hunting.

In the first place, a situation where switching control hunting occurs will be specifically explained for the case where switching of the operating state of the lockup clutch is determined based on the actual vehicle speed and the required (target) throttle opening derived from the required (target) driving force, from a predetermined lockup region diagram having the vehicle speed and the throttle opening as variables.

FIG. 21 is a lockup region diagram in which a lockup ON (OFF→ON) line indicated by the solid line and a lockup OFF (ON→OFF) line indicated by the broken line are plotted in a two-dimensional coordinate system having the horizontal axis indicating the vehicle speed and the vertical axis indicating the throttle opening corresponding to the engine torque.

In FIG. 21, point A indicates vehicle conditions represented by a certain vehicle speed V1 and a required throttle opening $\theta_{THA}$ that corresponds to required (target) engine torque and is derived from a required driving force F1 using the lockup-ON-time torque ratio (t=1) established when the lockup clutch is ON. Also, point B indicates vehicle conditions represented by the vehicle speed V1 and a required throttle opening $\theta_{THB}$ that corresponds to required engine torque and is derived from the same required driving force F1 as that of point A, using the lockup-OFF-time torque ratio (for example, t=1.2) established when the lockup clutch is OFF.

When the lockup clutch is ON, the vehicle conditions represented by the vehicle speed V1 and the required driving force F1 pass the lockup OFF line and fall on point A, so that the lockup clutch is switched to the OFF state. If the lockup clutch is switched to the OFF state, the vehicle conditions represented by the same vehicle speed V1 and the same required driving force F1 pass the lockup ON line and fall on point B, so that the lockup clutch is switched to the ON state. In this manner, switching control hunting occurs depending upon the required driving force and the torque ratio.

In the next place, a situation where switching control hunting occurs will be specifically explained for the case where switching of the operating state of the lockup clutch is determined based on the actual vehicle speed and the required driving force, from a lockup region diagram having the vehicle speed and the driving force as variables, into which a predetermined lockup region diagram having the vehicle speed and the throttle opening as variables is converted.

FIG. 22 is a lockup region diagram in the form of a two-dimensional coordinate system having the horizontal axis indicating the vehicle speed and the vertical axis indicating the driving force of the vehicle. In FIG. 22, a lockup ON line $A_{ON}$ indicated by the solid line and a lockup OFF line $A_{OFF}$ indicated by the broken line represent a pair of switching lines A for use in the lockup ON state in which the lockup-ON-time torque ratio (t=1) is used for converting the throttle opening into the driving force. Also, a lockup ON line $B_{ON}$ indicated by the one-dot chain line and a lockup OFF line $B_{OFF}$ indicated by the two-dot chain line represent a pair of switching lines B for use in the lockup OFF state in which the lockup-OFF-time torque ratio (for example, t=1.2) is used for converting the throttle opening into the driving force.

In FIG. 22, point C indicates vehicle conditions represented by a required driving force F2 and a certain vehicle speed V2. If the vehicle conditions fall on point C when the lockup clutch is OFF, the switching lines B for use in the lockup OFF state are applied, and point C lies in the ON region with respect to the lockup ON line $B_{ON}$, so that the lockup clutch is switched to the ON state. If the lockup clutch is placed in the ON state, on the other hand, the switching lines A for use in the lockup ON state are applied, and point C representing the same vehicle conditions lies in the OFF region with respect to the lockup OFF line $A_{OFF}$, so that the lockup clutch is switched to the OFF state. In this manner, switching control hunting occurs depending upon the required driving force and the torque ratio.

SUMMARY OF THE INVENTION

The invention is concerned with a control device of a vehicle including a lockup clutch capable of directly coupling the input and output of a hydraulic power transmitting device disposed in a power transmission path between a power source and driving wheels. It is an object of the invention to provide such a vehicular control device that is arranged to switch the lockup clutch to an operating state that is determined from predetermined switching lines, based on vehicle conditions, or determined according to a predetermined rule, without suffering from switching control hunting of the lockup clutch.

According to a first aspect of the invention a control device of a vehicle including a lockup clutch capable of directly coupling an input and an output of a hydraulic power transmitting device disposed in a power transmission path that extends from a power source to driving wheels, the control device being adapted to switch the lockup clutch to an operating state that is determined from predetermined switching lines, based on vehicle conditions, and comprising: (a) a first determining unit that determines switching of the operating state of the lockup clutch from the switching lines plotted based on a torque ratio of the hydraulic power transmitting device which is established when the lockup clutch is in an engaged state, (b) a second determining unit that determines switching of the operating state of the lockup clutch from the switching lines plotted based on a torque ratio of the hydraulic power transmitting device which is established when the lockup clutch is in a released state, and (c) a switching determination selector that is operable, when one of the first and second determining units determines switching of the operating state of the lockup clutch, to select a determination made by the other determining unit as an effective determination about switching of the operating state of the lockup clutch once the other determining unit determines the same switching of the operating state as that determined by the above-indicated one of the first and second determining units.

The vehicular control device according to the first aspect of the invention is provided with the first determining unit that determines switching of the operating state of the lockup clutch, in accordance with the switching lines plotted based on the torque ratio of the hydraulic power transmitting device which is established when the lockup clutch is in an engaged (ON) state, and the second determining unit that determines switching of the operating state of the lockup clutch, in accordance with the switching lines based on the torque ratio of the hydraulic power transmitting device which is established when the lockup clutch is in a released (OFF) state. When one of the first and second determining units determines switching of the operating state of the lockup clutch, the switching determination selector selects a determination made by the other determining unit as an effective determination about switching of the operating state of the lockup clutch once the other determining unit determines the same switching of the operating state as that determined by the above-indicated one determining unit. Accordingly, the other determining unit is prevented from determining switching of the operating state of the lockup clutch in the opposite direction (i.e., switching back to the operating state prior to switching determined by the above-indicated one determining unit) immediately after the lockup clutch is switched to the operating state determined by the one determining unit. Thus, the lockup clutch is prevented from being switched back to the operating state opposite to that determined by the one determining unit, and switching control hunting of the lockup clutch is thus prevented.

Namely, when one of the first and second determining units determines that the lockup clutch should be switched from ON to OFF or OFF to ON, the other determining unit is kept or inhibited from determining switching of the operating state in the opposite direction until the other determining unit determines the same switching of the operating state as that determined by the above-indicated one determining unit. Thus, the lockup clutch is prevented from being switched to the operating state opposite to that determined by the above-indicated one determining unit, and switching control hunting of the lockup clutch is thus prevented.

According to a second aspect of the invention, there is provided a control device of a vehicle including a lockup clutch capable of directly coupling an input and an output of a hydraulic power transmitting device disposed in a power transmission path that extends from a power source to driving wheels, the control device being adapted to switch the lockup clutch to an operating state that is determined from predetermined switching lines, based on vehicle conditions, and comprising: (a) a target driving-force setting unit that sets a target driving-force for the vehicle; (b) a target load calculator that calculates a target load of the power source, based on the target driving-force set by the target driving-force setting unit; (c) a first determining unit that determines switching of the operating state of the lockup clutch, using the first target load calculated by the target load calculator based on a torque ratio of the hydraulic power transmitting device which is established when the lockup clutch is in an engaged state; (d) a second determining unit that determines switching of the operating state of the lockup clutch, using the second target load calculated by the target load calculator based on a torque ratio of the hydraulic power transmitting device which is established when the lockup clutch is in a released state; and (e) a switching determination selector that is operable, when one of the first and second determining units determines switching of the operating state of the lockup clutch, to select a determination made by the other determining unit as an effective determination about switching of the operating state of the lockup clutch once the other determining unit determines the same switching of the operating state as that determined by the above-indicated one of the first and second determining units.

The vehicular control device according to the second aspect of the invention is provided with the first determining unit that determines switching of the operating state of the lockup clutch, using the first target load calculated based on a torque ratio of the hydraulic power transmitting device established when the lockup clutch is in an engaged state, and the second determining unit that determines switching of the operating state of the lockup clutch, using the target load calculated based on the torque ratio of the hydraulic power transmitting device established when the lockup clutch is in a released state. When one of the first and second determining units determines switching of the operating state of the lockup clutch, the switching determination selector selects a determination made by the other determining unit as an effective determination about switching of the operating state of the lockup clutch once the other determining unit determines the same switching of the operating state as that determined by the above-indicated one determining unit. Accordingly, the other determining unit is prevented from determining switching of the operating state of the lockup clutch in the opposite direction (i.e., switching back to the operating state prior to switching determined by the above-indicated one determining unit) immediately after the lockup clutch is switched to the operating state determined by the one determining unit. Thus, the lockup clutch is prevented from being switched back to the operating state opposite to that determined by the one determining unit, and switching control hunting of the lockup clutch is thus prevented.

Namely, when one of the first and second determining units determines that the lockup clutch should be switched from ON to OFF or OFF to ON, the other determining unit is kept or inhibited from determining switching of the operating state in the opposite direction until the other determining unit determines the same switching of the operating state as that determined by the above-indicated one determining unit. Thus, the lockup clutch is prevented from being switched to the operating state opposite to that determined by the above-indicated one determining unit, and switching control hunting of the lockup clutch is thus prevented.

In the control device according to the first or second aspect of the invention, the switching lines may include a lockup ON line used for determining switching of the lockup clutch from the released state to the engaged state, and a lockup OFF line used for determining switching of the lockup clutch from the engaged state to the released state, and the lockup ON line and the lockup OFF line may be separated by a space. With this arrangement, switching control hunting of the lockup clutch is prevented with improved reliability.

According to a third aspect of the invention, there is provided a control device of a vehicle including a lockup clutch capable of directly coupling an input and an output of a hydraulic power transmitting device disposed in a power transmission path that extends from a power source to driving wheels, the control device being adapted to switch the lockup clutch to an operating state that is determined according to a predetermined rule, and comprising: (a) a harmonizing unit that harmonizes plural target driving-forces for the vehicle, to select a target driving-force for use in control of the lockup clutch, the target driving-force being derived from command values produced by a plurality of control systems, (b) a rule selector that has a first rule according to which switching of the operating state of the lockup clutch is determined based on the target driving-force, and a second rule according to which switching of the operating state of the lockup clutch is determined based on a target load of the power source, and that selects a determination made according to the first rule as an effective determination about switching of the operating state of the lockup clutch when the harmonizing unit selects a command value from a control system as one of the above-indicated control systems which performs control based on the target driving-force, and selects a determination made according to the second rule as an effective determination about switching of the operating state of the lockup clutch when the harmonizing unit selects a command value from a control system as one of the above-indicated control systems which performs control based on the target load.

With the control device constructed as described above, when the harmonizing unit selects a command value from a control system that performs control based on the target driving-force, the rule selector selects a determination made according to the first rule based on the target driving-force, as an effective determination about switching of the operating state of the lockup clutch. When the harmonizing unit selects a command value from a control system that performs control based on the target load, on the other hand, the rule selector selects a determination made according to the second rule based on the target load of the power source, as an effective determination about switching of the operating state of the lockup clutch. This arrangement avoids a problem that the torque ratio of the hydraulic power transmitting device which changes upon switching of the operating state of the lockup clutch is involved in conversion between the target driving-force and the target load as bases of determination about switching of the operating state of the lockup clutch. Thus, switching control hunting of the lockup clutch is prevented.

In the control device according to the third aspect of the invention, the target driving-force used according to the first rule may be derived through conversion from the target load used according to the second rule, so as to ensure consistency between the result of determination according to the first rule and the result of determination according to the second rule.

Preferably, a wide range of internal combustion engines, such as a gasoline engine and a diesel engine, may be used as the power source. Also, an electric motor, or the like, may be used as an auxiliary power source, in addition to the engine, or an electric motor may be solely used as the power source. When the electric motor is used as part of the power source, a target throttle opening and a target drive current supplied from, for example, a capacitor for driving the motor are calculated so that the sum of the power of the engine and the power of the motor becomes equal to the above-mentioned target driving-force.

Preferably, a torque converter, a fluid coupling, or the like, is used as the hydraulic power transmitting device. Also, an automatic transmission may be disposed in the power transmission path that extends from the power source to the drive wheels, and the hydraulic power transmitting device may be disposed between the power source and the automatic transmission.

Preferably, the above-mentioned automatic transmission consists of one or a combination of the following types of transmissions: (a) various planetary-gear type multi-speed automatic transmissions having, for example, four speeds (gear positions), five speeds, six speeds or more for forward running, in which a selected one of a plurality of gear positions is established by selectively coupling rotary elements of a plurality of planetary gear units by means of friction devices, (b) a parallel two-axis type synchromesh automatic transmission in which a plurality of pairs of gears, which are in constant mesh, are provided between two axes or shafts, and a selected one or ones of the pairs of gears is/are brought into a power transmitting condition by means of a synchronizer driven by a hydraulic actuator, or the like, so that the speed (or gear position) is automatically changed, (c) a belt type continuously variable transmission in which a power transmission belt that functions as a power transmitting member is wound around a pair of variable pulleys whose effective diameters are variable, and the speed ratio is steplessly or continuously changed, (d) a toroidal type continuously variable transmission having a pair of cone members to be rotated about a common axis and a plurality of rollers sandwiched between the cone members to be rotatable about a center of rotation that intersects with the common axis, wherein the speed ratio is continuously changed by changing the angle of intersection between the center of rotation of the rollers and the axis of the cone members, and (e) an automatic transmission, such as a drive system for hybrid vehicles which functions as an electric continuously variable transmission, having a differential mechanism consisting of, e.g., a planetary gear unit through which the power of the engine is distributed to a first electric motor and an output shaft, and a second electric motor provided on the output shaft of the differential mechanism, wherein a main portion of the power of the engine is transmitted to the drive wheels due to the operation of the differential mechanism, and the remaining portion of the power of the engine is electrically transmitted by use of an electric path from the first electric motor to the second electric motor, so that the speed ratio is electrically changed.

Preferably, the automatic transmission is installed on the vehicle, such that the axis of the automatic transmission extends in the width direction (or lateral direction) of the vehicle, as in a FF (front-engine, front-drive) vehicle, or such that the axis of the automatic transmission extends in the longitudinal direction of the vehicle, as in a FR (front-engine, front-drive) vehicle.

Preferably, a wide range of friction devices, such as multi-plate or single-plate clutches or brakes that are engaged or applied by hydraulic actuators, or belt-type brakes, are used as the friction devices in the above-mentioned planetary-gear type multi-speed transmissions. An oil pump that supplies hydraulic oil for engaging the hydraulic friction devices may be driven by, for example, a power source for running the vehicle, to deliver the hydraulic oil, or may be driven by a dedicated electric motor, or the like, provided separately from the power source. Also, the clutches or brakes may be electromagnetic devices, such as electromagnetic clutches or magnetic particle clutches, other than the hydraulic friction devices.

Preferably, the above-mentioned driving-force may be determined a related value (equivalent value) having a one-to-one relationship with the vehicle driving force (hereinafter referred to as "driving force") produced by the driving wheels. Other parameters may also be used to determine the driving force. The parameters may include, for example, the vehicle acceleration, torque (hereinafter referred to as "axle torque" or "driving shaft torque") exerted on the axles, power of the vehicle, torque (hereinafter referred to as "engine torque") exerted on the crankshaft as the output torque of the engine, torque (hereinafter referred to as "turbine torque") exerted on the turbine shaft of the torque converter as the output torque of the torque converter 14, i.e., torque (hereinafter referred to as "input shaft torque") exerted on the input shaft as the input torque of the automatic transmission, and torque (hereinafter referred to as "output shaft torque") exerted on the output shaft as the output torque of the automatic transmission.

BRIEF DESCRIPTION OF THE DRAWINGS

The foregoing and/or further objects, features and advantages of the invention will become more apparent from the following description of exemplary embodiments with reference to the accompanying drawings, in which like numerals are used to represent like elements and wherein.

DETAILED DESCRIPTION OF EXEMPLARY EMBODIMENTS

Some exemplary embodiments of the invention wilt be described in detail with reference to the drawings.

First Embodiment

Figure 1:
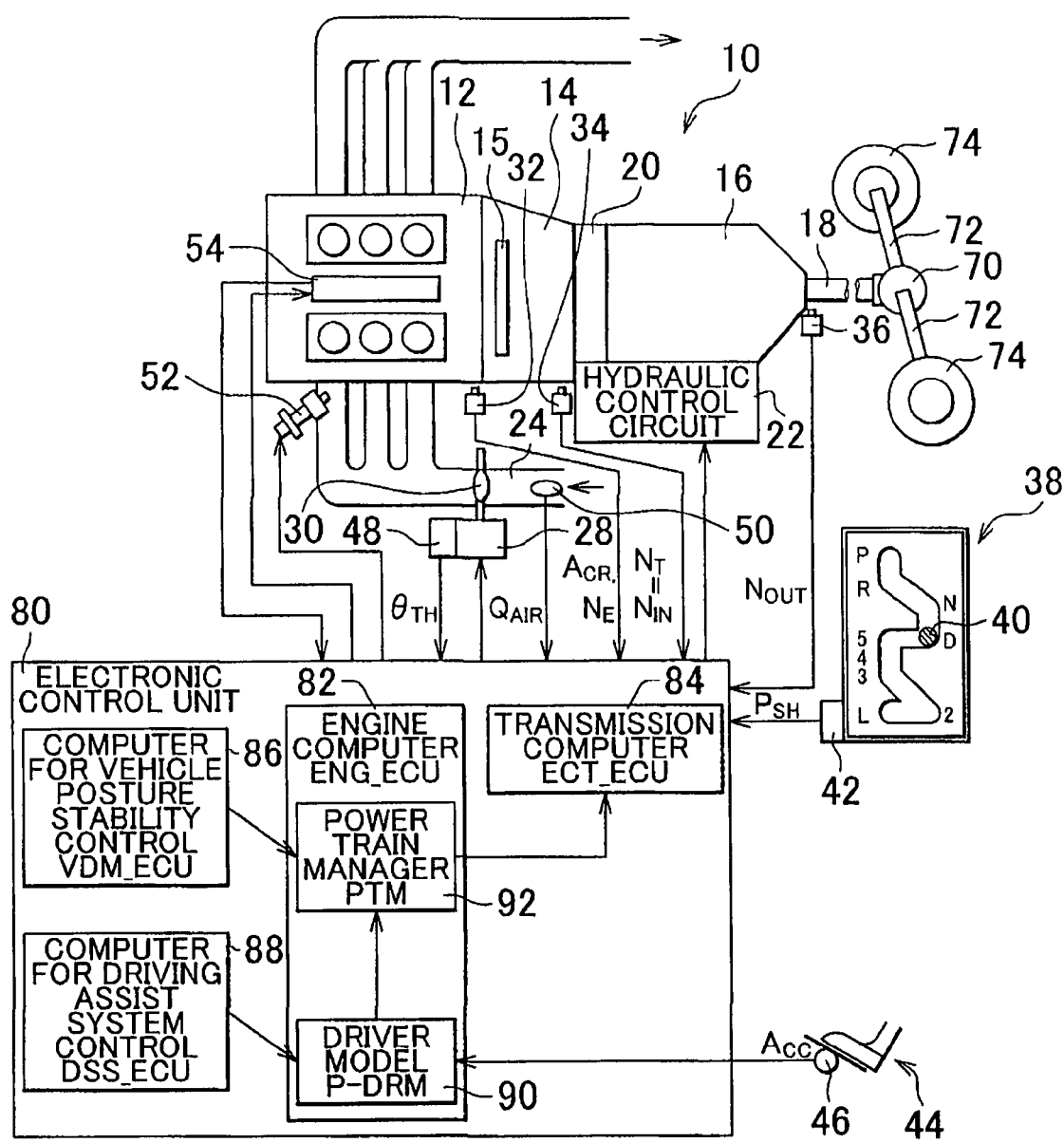
FIG. 1 is a view schematically showing the construction of a power transmitting system to which the invention is applied, and includes a block diagram that explains principal parts of a control device provided in the vehicle for controlling the power transmitting system.

FIG. 1 schematically shows the construction of a power transmitting system 10 to which the invention is applied. FIG. 1 includes a block diagram that explains principal parts of a control device provided in the vehicle for controlling the power transmitting system 10 and other components. In the power transmitting system 10, a torque converter 14 and an automatic transmission 16 are serially disposed on a common axis in a transmission case as a non-rotating member mounted on the vehicle body. The automatic transmission 16 is operatively coupled, via the torque converter 14, to a crankshaft of an engine 12 serving as a power source or a source of driving force for running the vehicle. The power produced by the engine 12 is transmitted to the automatic transmission 16 via the torque converter 14, and is then transmitted from an output shaft 18 of the automatic transmission 16 to left and right driving wheels 74, via a differential gear unit (final reduction gear unit) 70, a pair of axles 72 serving as driving shafts, and so forth.

The torque converter 14 includes a pump impeller coupled to the crankshaft of the engine 12, a turbine wheel coupled to the input shaft of the automatic transmission 16, a lockup clutch 15, and a stator that is inhibited by a one-way clutch from rotating in one direction. The lockup clutch 15 is provided for directly coupling the pump impeller with the turbine wheel, namely, directly coupling the input and output of the torque converter 14, so as to directly transmit the power of the engine 12 to the input shaft of the automatic transmission 16 without utilizing fluid or oil.

The lockup clutch 15 is a hydraulic friction clutch that is engaged by friction based on a pressure difference ΔP between the oil pressure in the apply-side oil chamber and the oil pressure in the release-side oil chamber. By fully engaging the lockup clutch 15 to establish a "lockup ON" status, the pump impeller and the turbine wheel are rotated as a unit so as to directly transmit the power of the engine 12 to the input shaft of the automatic transmission 16. Also, the pressure difference ΔP, or the torque capacity, is controlled in a feedback manner so that the lockup clutch 15 is engaged in a certain slipping condition. As a result, while the vehicle is being driven (i.e., in a power-ON mode), the turbine shaft (input shaft) is rotated following rotation of the crankshaft of the engine 12 with a certain slip amount of, for example, about 50 rpm. While the vehicle is not being driven (i.e., in a power-OFF mode), on the other hand, the crankshaft of the engine 12 is rotated following rotation of the turbine shaft with a certain slip amount of, for example, about 50 rpm.

The automatic transmission 16 is a multi-speed automatic transmission capable of establishing a selected one of a plurality of speeds (or gear positions), and is operable to reduce or increase the speed of input rotation at a certain speed ratio or gear ratio γ. The automatic transmission 16 is in the form of, for example, a planetary-gear type automatic transmission having a plurality of speeds or gear positions, which are respectively established by engaging specified combinations of hydraulic friction devices, such as clutches and brakes, by means of, for example, hydraulic actuators. For example, the automatic transmission 16 is arranged to establish one of six forward gear positions, one reverse gear position and a neutral position, by changing the speed of the input shaft of the transmission 16 at the gear ratio γ of the selected gear position. A hydraulic control circuit 22, which uses a line pressure as an original pressure, is arranged to control the respective hydraulic friction devices of the automatic transmission 16. The line pressure is established by regulating an oil pressure (acting as an original pressure) generated by a mechanical oil pump 20 that is mechanically coupled to the engine 12 and is directly rotated or driven by the engine 12. The line pressure provides the maximum engaging pressure used for engaging each of the hydraulic friction devices of the automatic transmission 16.

An electronic control unit 80 includes a so-called microcomputer having CPU, RAM, ROM, input and output interfaces, and other components. The CPU performs signal processing according to programs stored in advance in the ROM, while utilizing the temporary storage function of the RAM. For example, the electronic control unit 80 is configured to perform power control of the engine 12, shift control of the automatic transmission 16, and other controls, and may be divided, as needed, into an engine computer 82 (hereinafter referred to as "ENG_ECU 82"), a transmission computer 84 (hereinafter referred to as "ECT_ECU 84"), a computer 86 for vehicle posture stability control (hereinafter referred to as "VDM_ECU 86"), a computer 88 for driving assist system control (hereinafter referred to as "DSS_ECU 88"), and so forth.

The electronic control unit 80 is connected to various sensors and switches provided in the vehicle, which include, for example, a crankshaft position sensor 32 that detects the crankshaft angle (position) $A_{CR}(°)$ and the speed of the crankshaft corresponding to the rotational speed $N_E$ of the engine 12, a turbine speed sensor 34 that detects the rotational speed $N_T$ of the turbine wheel of the torque converter 14 or the input rotation speed $N_{IN}$ of the automatic transmission 16, an output shaft speed sensor 36 that detects the rotational speed $N_{OUT}$ of the output shaft 18 as a vehicle speed, a shift position sensor 42 that detects the lever position (selected position) $P_{SH}$ of the shift lever 40, an acceleration stroke sensor 46 that detects the accelerator pedal travel $A_{CC}$ as the amount of operation of the accelerator pedal 44, a throttle position sensor 48 that detects the opening angle of an electronic throttle valve 30 mounted in an intake pipe 24, or the throttle opening $\theta_{TH}$ as a load of the engine 12, and an intake air amount sensor 50 that detects the intake air amount or air mass flow $Q_{AIR}$ of the engine 12. From these sensors, the electronic control unit 80 receives signals indicative of the crankshaft angle (position) $A_{CR}(°)$ and the crankshaft speed corresponding to the engine speed $N_E$, turbine speed $N_T$ (=input rotation speed $N_{IN}$), output shaft speed $N_{OUT}$ as a vehicle speed, shift lever position $P_{SH}$, accelerator pedal travel $A_{CC}$, throttle opening $\theta_{TH}$, and the intake air amount $Q_{AIR}$.

Also, the electronic control unit 80 generates control signals for controlling the engine power, which include, for example, a drive signal to a throttle actuator 28 for adjusting the throttle opening $\theta_{TH}$ of the electronic throttle valve 30, an injection signal for controlling the amount $F_{EFI}$ of fuel injected from a fuel injector 52, and an ignition signal to an igniter 54 for controlling the ignition timing of the engine 12. The electronic control unit 80 also generates valve command signals for controlling, for example, energization and deenergization of solenoid valves in the hydraulic control circuit 22 for changing the speed or gear position of the automatic transmission 16.

Here, the above-mentioned vehicle-speed may be determined based on a related value (equivalent value) having a one-to-one relationship with the vehicle speed V, i.e., the running speed of the vehicle. Other than the vehicle speed V, which is naturally used as a vehicle-speed related value, the above-indicated output shaft speed $N_{OUT}$, the rotational speed of the axles 72, the rotational speed of the propeller shaft, the rotational speed of the output shaft of the differential gear unit 70, or the like, may also be used as a vehicle-speed related value. In the following description or this embodiment, what is called "vehicle speed" also represents a vehicle-speed related value unless otherwise specified.

The load related value of the engine 12 is a related value (equivalent value) that corresponds to the power of the engine. Other than the torque $T_E$ exerted on the crankshaft (hereinafter referred to as "engine torque") as the output torque of the engine 12, which is naturally used as a load related value, the above-indicated throttle opening $\theta_{TH}$, intake air amount $Q_{AIR}$, fuel injection amount $F_{EFI}$, or the like, may also be used as a load related value.

The accelerator pedal 44, which serves as an operating member for adjusting the power of the engine, is depressed by a degree commensurate with the amount of power requested by the driver, and the accelerator pedal travel $A_{CC}$ as the amount of operation of the accelerator pedal 44 represents the required amount of power.

The hydraulic control circuit 22 includes linear solenoid valves SLT, or the like, for mainly controlling the line pressure, as well as the above-mentioned solenoid valves for use in shift control. The hydraulic oil in the hydraulic control circuit 22 may also be used for lubrication of the automatic transmission 16 and other parts. The hydraulic control circuit 22 also includes a manual valve that is coupled to the shift lever 40 via a cable or a link, and the manual valve is mechanically actuated in accordance with the operation of the shift lever 40, so as to change oil paths in the hydraulic control circuit 22.

A shifting device 38 is one example of operating device as a shift range selection device having the shift lever 40, and is mounted, for example, in the center console at the side of the driver's seat. The shift lever 40 is operated to one of the shift lever positions $P_{SH}$ provided in the shifting device 38. More specifically, the shift lever positions $P_{SH}$ include a parking position "P (Parking)" or P range, a reverse-running position "R (Reverse)" or R range for reverse running, a neutral position "N (Neutral)" or N range, a forward-running position "D (Drive)" (the highest-speed position) or D range, a fifth engine-brake running position "5" or five-speed range, a fourth engine-brake running position "4" or four-speed range, a third engine-brake running position "3" or three-speed range, a second engine-brake running position "2" or two-speed range, and a first engine-brake running position "L" or "L" range. When the shift lever 40 is placed in the P range, the automatic transmission 16 is in a neutral condition in which its power transmission path is cut off, and the output shaft 18 of the automatic transmission 16 is locked. In the N range, the automatic transmission 16 is in a neutral condition in which its power transmission path is cut off. In the D range, the automatic transmission 16 is automatically shifted over a range from the 1st speed to the 6th speed in an automatic shift mode. In the five-speed range, the automatic transmission 16 is automatically shifted over a range from the 1st speed to the 5th speed, and the engine brake is applied when the transmission 16 is placed in each of the gear positions or speeds. In the four-speed range, the automatic transmission 16 is automatically shifted over a range from the 1st speed to the 4th speed, and the engine brake is applied at each of the speeds. In the three-speed range, the automatic transmission 16 is automatically shifted in a range from the 1st speed to the 3rd speed, and the engine brake is applied at each of the speeds. In the two-speed range, the automatic transmission 16 is automatically shifted over a range from the 1st speed to the 2nd speed, and the engine brake is applied at each of the speeds. In the L range, the vehicle runs at the 1st speed while the engine brake is being applied.

The ENG_ECU 82 causes a driver model 90 (hereinafter referred to as "P-DRM 90") to set a driving-force related value (hereinafter referred to as "target driving-force related value") that represents target driving force to be produced by the vehicle, based on the amount of power required of the vehicle, which is obtained from a signal indicative of the accelerator pedal travel $A_{CC}$. The driver model 90 also sets a driver-model target driving-force related value by harmonizing the target driving-force related value based on the accelerator pedal travel $A_{CC}$ with a target driving-force related value generated from the DSS_ECU 88. The ENG_ECU 82 then causes a power train manager 92 (hereinafter referred to as "PTM 92") to set a final target driving-force related value by harmonizing the driver-model target driving-force related value with a target driving-force related value generated from the VDM_ECU 86, and controls the power of the engine 12 so as to achieve the final target driving-force related value.

The ECT_ECU 84 makes judgments about shifting of the automatic transmission 16 (i.e., selects the gear position to be established by the automatic transmission 16) based on vehicle running conditions, including, for example, the vehicle speed V and a controlled variable, such as a throttle opening $\theta_{TH}$, used by the ENG_ECU 82 for power control of the engine 12, and controls shifting of the automatic transmission 16.

Each of the VDM_ECU 86 and DSS_ESU 88 generates a target driving-force related value as an amount of power required of the vehicle, so as to automatically control vehicle conditions irrespective of the accelerator pedal travel $A_{CC}$.

For example, the VDM_ECU 86 generates a target driving-force related value for use in vehicle posture stability control, and the DSS_ECU 88 generates a target driving-force related value for use in driving assist system control.

Thus, the electronic control unit 80 of this embodiment sets a target driving-force related value of the vehicle, and executes power control of the engine 12 and/or shift control of the automatic transmission 16 so as to provide the target driving-force related value, thereby to implement so-called driving-force demand type control for controlling the vehicle driving force F.

Here, the above-mentioned driving-force related value is a related value (equivalent value) having a one-to-one relationship with the vehicle driving force (hereinafter referred to as "driving force") exerted by the driving wheels 74 on the road surface. Other than the driving force F that is naturally used as a driving-force related value, other parameters may also be used as driving-force related values. The parameters may include, for example, the acceleration G [G, m/s$^2$], torque (hereinafter referred to as "axle torque" or "driving shaft torque") $T_D$ [Nm] exerted on the axles 72, power of the vehicle P [PS, kW, HP], torque (hereinafter referred to as "turbine torque") $T_T$ [Nm] exerted on the turbine shaft of the torque converter 14 as the output torque of the torque converter 14, i.e., torque (hereinafter referred to as "input shaft torque") $T_{IN}$ [Nm] exerted on the input shaft as the input torque of the automatic transmission 16, torque (hereinafter referred to as "output shaft torque") $T_{OUT}$ [Nm] exerted on the output shaft 18 as the output torque of the automatic transmission 16, and torque $T_P$ [Nm] exerted on the propeller shaft. In the following description of this embodiment, what is called "driving force" also represents a driving-force related value unless otherwise specified.

Figure 2:
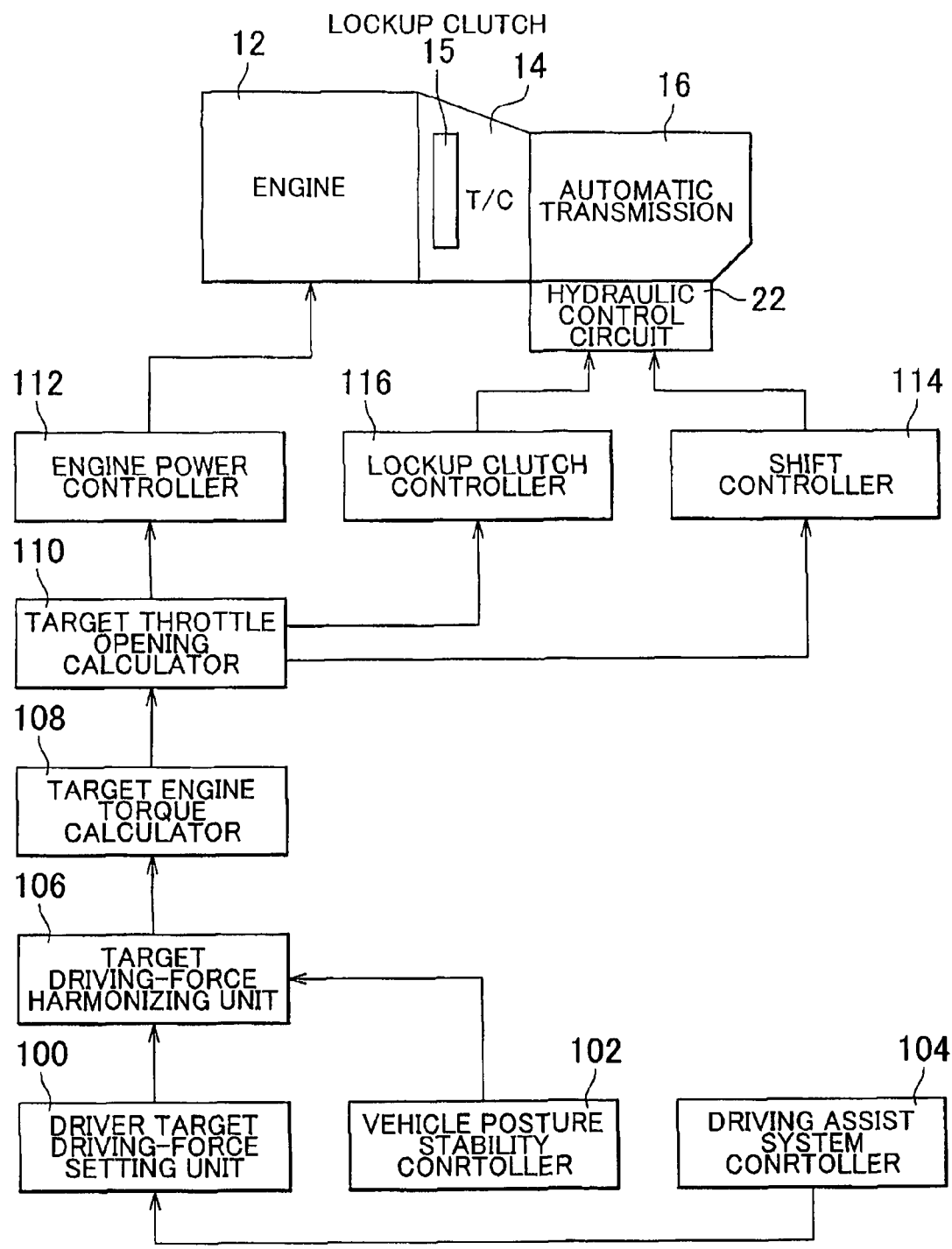
FIG. 2 is a function block diagram that explains principal control functions performed by an electronic control unit of FIG. 1.
Figure 3:
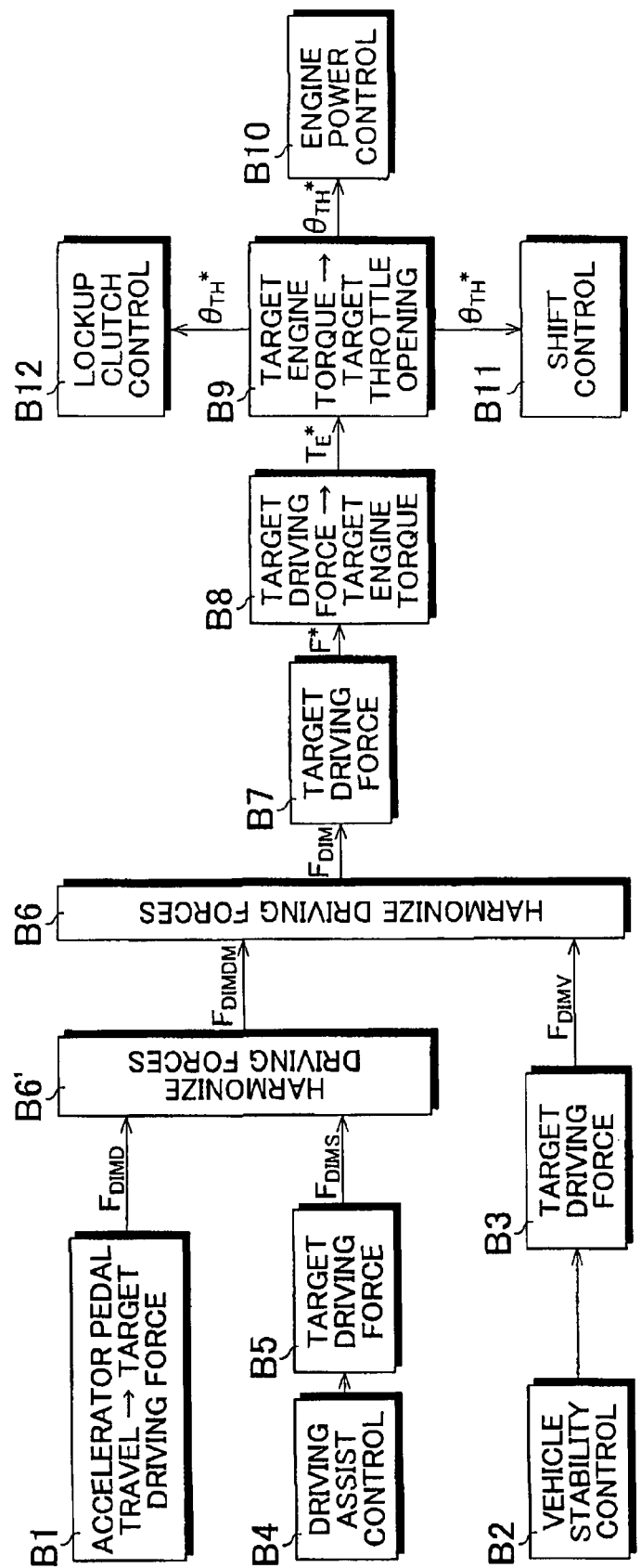
FIG. 3 is a block diagram schematically showing the flow of control of the electronic control unit of FIG. 1, including, for example, setting of a target driving force, calculation of a target throttle opening for use in power control of the engine, power control of the engine, judgment on shifting of the automatic transmission and judgment on switching of the operating state of the lockup clutch.

FIG. 2 is a function block diagram that explains principal control functions performed by the electronic control unit 80. FIG. 3 is a block diagram schematically showing the flow of control of the electronic control unit 80, including, for example, setting of a target driving force F*, calculation of a target throttle opening $\theta_{TH}$* for use in power control of the engine 12, power control of the engine 12, shift judgment for the automatic transmission 16, and judgment on switching of the operating state of the lockup clutch 15.

Figure 4:
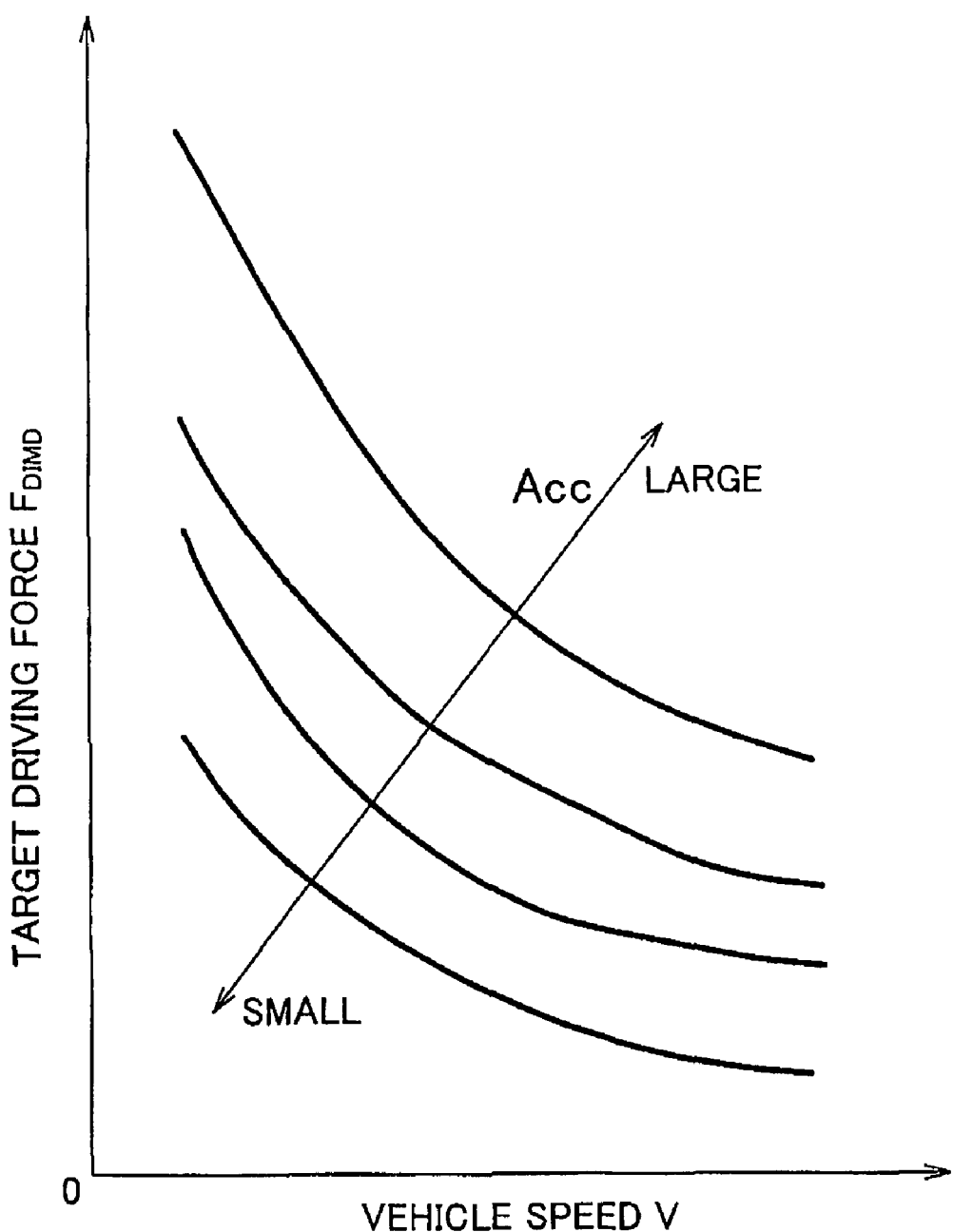
FIG. 4 is a map indicating a relationship between the vehicle speed and the driver target driving force with respect to the accelerator pedal travel as a parameter, which map was empirically obtained and is stored in advance for setting the target driving force based on the accelerator pedal travel and the vehicle speed.

In FIG. 2, a driver target driving-force setting unit 100, which corresponds to block B1 of FIG. 3, sets a driver target driving force $F_{DIMD}$ based on the actual accelerator pedal travel $A_{CC}$ and the vehicle speed V, from a relationship (map) between the vehicle speed V and the driver target driving force $F_{DIMD}$ with respect to the accelerator pedal travel $A_{CC}$ as a parameter, as shown in, for example, FIG. 4. The map of FIG. 4 was empirically obtained and is stored in advance in the electronic control unit 80.

A vehicle posture stability controller 102, which corresponds to blocks B2 and B3 of FIG. 3, functionally includes a so-called VSC system that performs vehicle posture stability control for stabilizing the vehicle posture when turning, irrespective of the accelerator pedal travel $A_{CC}$. In order to produce the rear-wheel anti-skid moment and front-wheel anti-skid moment to ensure sufficient stability of the vehicle posture, based on the likelihood of a rear-wheel skid (or so-called oversteering) or the likelihood of a front-wheel skid (or so-called understeering), the VSC system generates a vehicle-stability target driving force $F_{DIMV}$ for restricting the driving force F, while at the same time controlling the braking forces of the wheels.

A driving assist system controller 104, which corresponds to blocks B4 and B5 of FIG. 3, functionally includes a so-called cruise control system, or an automatic vehicle-speed control system, which performs driving assist system control by automatically controlling the vehicle speed V irrespective of the accelerator pedal travel $A_{CC}$. The cruise control system generates a driving-assist target driving force $F_{DIMS}$ for controlling the driving force F, while at the same time controlling the braking forces of the wheels, so that the vehicle runs at a target vehicle speed V* set by the driver.

The above-mentioned driver target driving-force setting unit 100, which also corresponds to block B6' of FIG. 3, determines which target driving force $F_{DIM}$, of the driver target driving force $F_{DIMD}$ set based on the actual accelerator pedal travel $A_{CC}$ and the vehicle speed V and the driving-assist target driving force $F_{DIMS}$ set by the driving assist system controller 104, is given a higher priority, or determines which target driving force $F_{DIM}$ is to be increased or reduced, according to a predetermined driving-force harmonizing procedure. Then, the driver target driving-force setting unit 100 sets the selected target driving force $F_{DIM}$ as a driver-model target driving force $F_{DIMDM}$.

A target driving-force harmonizing unit 106, which corresponds to blocks B6 and B7 of FIG. 3, determines which target driving force $F_{DIM}$, of the driver-model target driving force $F_{DIMDM}$ set by the driver target driving-force setting unit 100 and the vehicle-stability target driving force $F_{DIMV}$ set by the vehicle posture stability controller 102, is given a higher priority, or determines which target driving force $F_{DIM}$ is to be increased or reduced, according to a predetermined driving-force harmonizing procedure. Then, the target driving-force harmonizing unit 106 sets the selected target driving force $F_{DIM}$ as a target driving force F*. Thus, the target driving-force harmonizing unit 106 functions as a target driving-force setting means for setting a target driving force F* to be produced by the vehicle.

According to the above-mentioned driving-force harmonizing procedure, the higher priority is normally given to the vehicle-stability target driving force $F_{DIMV}$ or the driving-assist target driving force $F_{DIMS}$. However, when the shift lever 40 is operated to change the gear position of the automatic transmission 16, or when the accelerator pedal 44 is depressed by a degree larger than a predetermined value, for example, the higher priority is given to the driver target driving force $F_{DIMD}$.

A target engine torque calculator 108, which corresponds to block B8 of FIG. 3, calculates a target engine torque $T_E^*$ that achieves the target driving force F* set by the target driving-force harmonizing unit 106. For example, the target engine torque calculator 108 calculates the target engine torque $T_E^*$ according to the following equation (1):

$$T_E^* = (F^* \times r_w)/(\gamma \times i \times \eta \times t) \qquad (1)$$

where F* is target driving force, $\gamma$ is gear ratio of the automatic transmission 16 that is in the current gear position, i is reduction gear ratio of the differential gear unit 70, $r_w$ is effective tire radius of the driving wheels 74, $\eta$ is power transmission efficiency, and t is torque ratio (=turbine torque $T_T$/pump torque (engine torque $T_E$)) of the torque converter 14.

Figure 5:
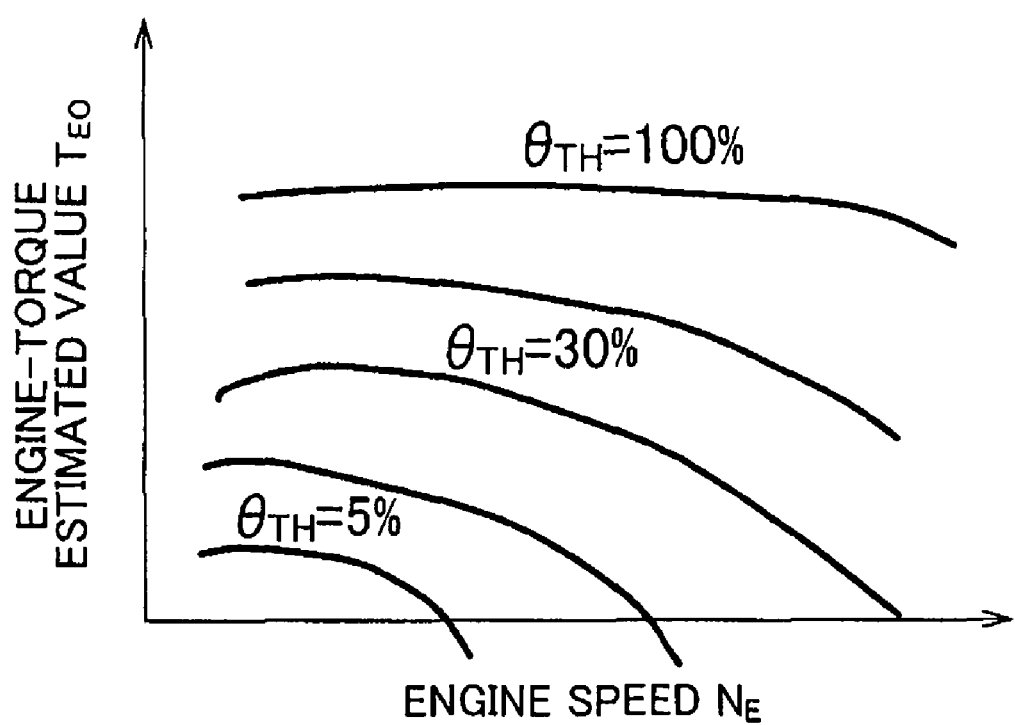
FIG. 5 is a map indicating a relationship between the engine speed and the engine-torque estimated value with respect to the throttle opening as a parameter, which map was empirically obtained and is stored in advance for calculating the target throttle opening corresponding to the engine-torque estimated value that provides the target engine torque, based on the engine speed.

A target throttle opening calculator 110, which corresponds to block B9 of FIG. 3, calculates a target throttle opening $\theta_{TH}^*$ that provides the target engine torque $T_E^*$ calculated by the above-mentioned target engine torque calculator 108. For example, the target throttle opening calculator 110 calculates a target throttle opening $\theta_{TH}^*$ corresponding to an engine-torque estimated value $T_{E0}$ that provides the target engine torque $T_E^*$, based on the actual engine speed $N_E$, from a relationship (or map defining a relationship) between the engine speed $N_E$ and the engine-torque estimated value $T_{E0}$ with respect to the throttle opening $\theta_{TH}$ as a parameter, as shown in FIG. 5. The map of FIG. 5, which indicates engine torque characteristics, was empirically obtained and is stored in advance in the electronic control unit 80.

An engine power controller 112, which corresponds to block B10 of FIG. 3, controls opening and closing of the electronic throttle valve 30 by the throttle actuator 28 so that the throttle opening becomes equal to the target throttle opening $\theta_{TH}^*$ calculated by the above-mentioned target throttle opening calculator 110. The engine power controller 112 also controls the amount of fuel injected from the fuel injector 52, and controls the ignition timing of the igniter 54.

Figure 6:
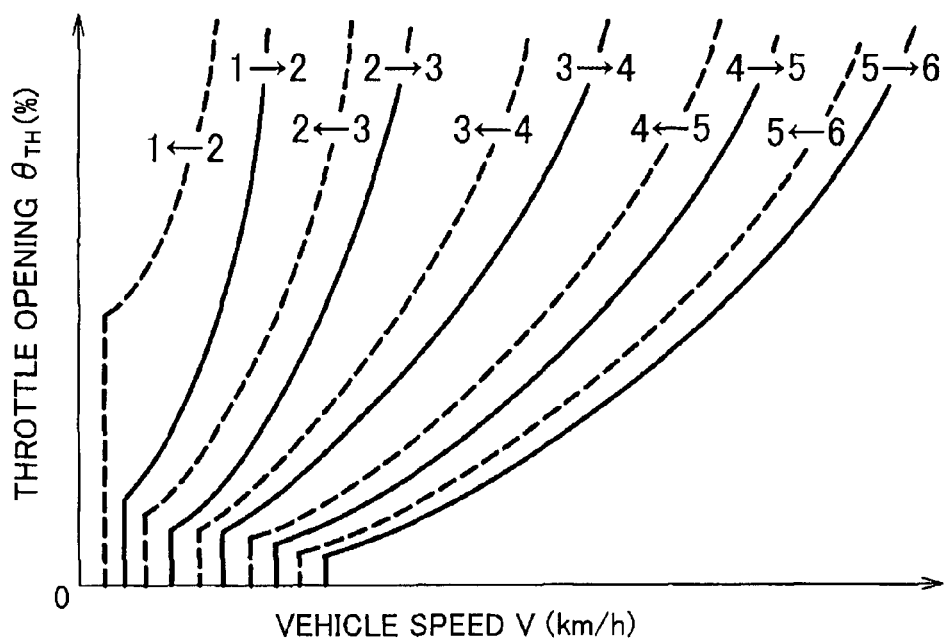
FIG. 6 is a shift diagram or shift map stored in advance in the form of a two-dimensional coordinate system having the axis indicating the vehicle speed and the axis indicating the throttle opening, which diagram is used for shift control of the automatic transmission performed by the electronic control unit of FIG. 1.

A shift controller 114, which corresponds to block B11 of FIG. 3, determines the gear position to which the automatic transmission 16 should be shifted, based on the actual vehicle speed V and the target throttle opening $\theta_{TH}^*$ calculated by the target throttle opening calculator 110, from a shift diagram (or shift map) as shown in, for example, FIG. 6. The shift diagram of FIG. 6, which is stored in advance in the electronic control unit 80, is a two-dimensional coordinate system in which the horizontal axis indicates the vehicle speed V and the vertical axis indicates the throttle opening $\theta_{TH}$. The shift controller 114 then executes shifting of the automatic transmission 16 so as to establish the gear position thus determined. In order to execute shifting of the automatic transmission 16, the shift controller 114 generates a shift command signal to the hydraulic control circuit 22 so as to engage or disengage a selected one or ones of the hydraulic friction devices (clutches and brakes).

In the shift diagram of FIG. 6, solid lines represent shift lines (upshift lines) used for making upshift determinations, and broken lines represent shift lines (downshift lines) used for making downshift determinations. As shown in FIG. 6, space that accommodates hysteresis is provided between the corresponding upshift lines and downshift lines so as to prevent shift hunting from occurring between upshift determinations and downshift determinations with respect to the same adjacent gears of the automatic transmission 16. According to the shift diagram of FIG. 6, the automatic transmission 16 is shifted to a lower-speed gear position having a larger gear ratio $\gamma$ as the vehicle speed V becomes lower or the target throttle opening $\theta_{TH}^*$ becomes larger. In FIG. 6, "1" through "6" mean the first speed "1st" through the sixth speed "6th". Also, the shift lines in the shift diagram of FIG. 6 are used for determining, for example, whether the target throttle opening $\theta_{TH}^*$ has passed any of the lines on the vertical line that indicates the actual vehicle speed V, namely, whether the target throttle opening $\theta_{TH}^*$ has exceeded a judgment value (throttle opening on a shift point) $\theta_S$ on a certain shift line at which shifting should be executed. The shift lines may be stored in advance in the form of a set of judgment values $\theta_S$ or throttle openings on shift points.

Figure 7:
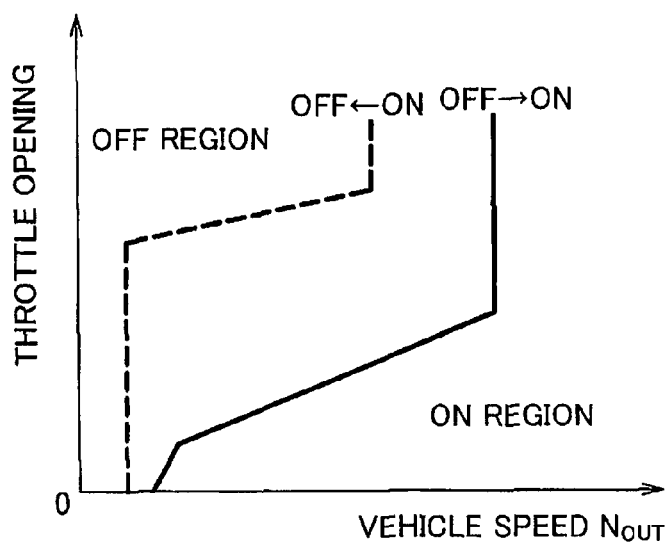
FIG. 7 is a lockup region diagram stored in advance and having a lockup OFF region and a lockup ON region in a two-dimensional coordinate system having the vehicle speed and the throttle opening as variables, which diagram is used for switching control of the lockup clutch performed by the electronic control unit of FIG. 1.

A lockup clutch controller 116, which corresponds to block B12 of FIG. 3, determines, only during acceleration of the vehicle, whether the vehicle operating conditions represented by the actual vehicle speed $N_{OUT}$ and the target throttle opening $\theta_{TH}^*$ calculated by the target throttle opening calculator 110 belong to an engagement (lockup ON) region or a release (lockup OFF) region, from a relationship (map, lockup region diagram) as shown in, for example, FIG. 7. The lockup region diagram of FIG. 7, which is stored in advance in the electronic control unit 80, is a two-dimensional coordinate system using the vehicle speed $N_{OUT}$ and the throttle opening $\theta_{TH}$ as variables and having the release (lockup OFF) region and the engagement (lockup ON) region. The lockup clutch controller 116 then generates a lockup switching command signal for changing the operating state of the lockup clutch 15 to the hydraulic control circuit 22 so as to bring the lockup clutch 15 into the operating state of the determined region.

In the lockup region diagram of FIG. 7, the solid line represents a switching line (lockup ON line) used for making a lockup ON determination, and the broken line represents a switching line (lockup OFF line) used for making a lockup OFF determination. As shown in FIG. 7, the switching lines include the lockup ON line and the lockup OFF line, and space that accommodates hysteresis is provided between the lockup ON line and the lockup OFF line so as to prevent switching control hunting from occurring between lockup ON determinations and lockup OFF determinations for the lockup clutch 15. According to the lockup region diagram of FIG. 7, the lockup clutch 15 is more likely to be switched to the OFF state as the vehicle speed $N_{OUT}$ becomes lower or the target throttle opening $\theta_{TH}^*$ becomes larger. Each of the switching lines is used for determining, for example, whether the target throttle opening $\theta_{TH}^*$ has passed the switching line on the vertical line that indicates the actual vehicle speed V, namely, whether the target throttle opening $\theta_{TH}^*$ has exceeded a judgment value (throttle opening on a switching point) $\theta_K$ on the switching line at which the lockup clutch 15 should be switched from the ON state to the OFF state or vice versa. Each of the switching lines may be stored in advance in the form of a set of judgment values $\theta_K$ or throttle openings on switching points. Although not illustrated in the drawings, switching lines (boundaries) may be provided for defining slip regions adjacent to the respective switching lines. In this case, the lockup clutch controller 116 makes determinations about the slip regions as well as the engagement region and the release region, so as to switch the operating state of the lockup clutch 15 to that of the selected region.

In the present embodiment in which the driving-force demand type control is performed as described above, the target throttle opening calculator 110 calculates the target throttle opening $\theta_{TH}{}^*$ that provides the target engine torque $T_E{}^*$ derived from the target driving force F*. Accordingly, if the torque ratio t in the above-indicated equation (1) changes depending upon the operating state of the lockup clutch 15, turbine speed $N_T$ (=input rotation speed $N_{IN}$), engine speed $N_E$ and other parameters, the target engine torque $T_E{}^*$ changes even if the target driving force F* is constant, and the target throttle opening $\theta_{TH}{}^*$ also changes in accordance with the target engine torque $T_E{}^*$.

Figure 21:
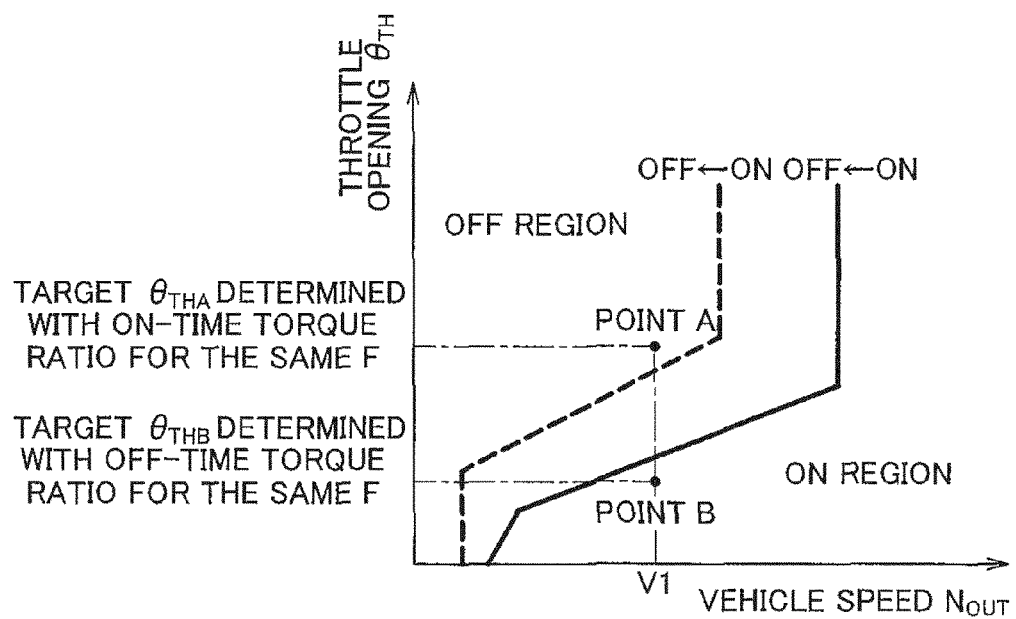
FIG. 21 is a lockup region diagram showing a lockup ON line and a lockup OFF line in a two-dimensional coordinate system having the axis indicating the vehicle speed and the axis indicating the throttle opening corresponding to engine torque, for explaining a situation where switching control hunting occurs.

In the above situation, switching control hunting may occur as described above with reference to FIG. 21. More specifically, at a certain vehicle speed $N_{OUT}$, suppose that the target throttle opening $\theta_{TH}{}^*$ corresponding to the target engine torque $T_E{}^*$ that is derived from a certain target driving force F* using the torque ratio (=1) established when the lockup clutch 15 is ON passes the lockup OFF line so that a lockup OFF determination is made (i.e., it is determined that the lockup clutch 15 should be released or switched OFF). While the lockup clutch 15 is in the OFF state at the same vehicle speed $N_{OUT}$, on the other hand, the target throttle opening $\theta_{TH}{}^*$ corresponding to the target engine torque $T_E{}^*$ that is derived from the same target driving force F* using the torque ratio (a value larger than 1) established when the lockup clutch 15 is OFF passes the lockup ON line so that a lockup ON determination is made (i.e., it is determined that the lockup clutch 15 should be engaged or switched ON). In this manner, switching control hunting may occur depending upon the target driving force F* or the torque ratio.

In the present embodiment, therefore, the target engine torque calculator 108 fixes the torque ratio t in the above-indicated equation (1), and calculates the target engine torque $T_E{}^*$ using the fixed torque ratio t. By fixing the torque ratio t, the target throttle opening calculator 110 calculates only one target throttle opening $\theta_{TH}{}^*$ with respect to the same target driving force F* without being influenced by the operating state of the lockup clutch 15, turbine speed $N_T$, engine speed $N_E$ and other parameters. Then, the lockup clutch controller 116 makes a determination on switching of the operating state of the lockup clutch 15 based on the target throttle opening $\theta_{TH}{}^*$ thus calculated, and, therefore, hunting does not occur to switching control of the lockup clutch 15. The torque ratio t is preferably fixed to 1 (which is the torque ratio established when the lockup clutch 15 is ON), so that a point determined by the vehicle speed $N_{OUT}$ and the target throttle opening $\theta_{TH}{}^*$ in the lockup region diagram of FIG. 7 is more likely to fall within the lockup OFF region, rather than the lockup ON region.

According to the present embodiment, since the torque ratio t is fixed when the target engine torque $T_E{}^*$ is calculated by the target engine torque calculator 108, as described above, the lockup clutch controller 116 makes a determination on switching of the operating state of the lockup clutch 15 based on the target throttle opening $\theta_{TH}{}^*$ calculated by the target throttle opening calculator 110, without being influenced by changes in the operating state of the lockup clutch 15 and other parameters, and switching control hunting of the lockup clutch 15 can be thus prevented.

Next, other exemplary embodiments of the invention will be described. In the following description, the same reference numerals as used in the preceding embodiment(s) will be used for identifying the same or corresponding elements or portions, of which no further explanation will be provided.

Second Embodiment

In this embodiment, a control operation that is different from that of the first embodiment is performed so as to prevent switching control hunting of the lockup clutch 15. The control operation of the second embodiment will be explained in detail.

In the second embodiment, when the lockup clutch 15 is switched to the OFF state as a result of an ON to OFF determination made based on the torque ratio (=1) established when the lockup clutch 15 is ON (which will be called "lockup-ON-time torque ratio"), a subsequent OFF to ON determination is made based on the target throttle opening $\theta_{TH}{}^*$ that is derived from the target driving force F* according to the above equation (1) in which the lockup-ON-time torque ratio t (=1) is used even if the lockup clutch 15 is currently in the OFF state. If the target throttle opening $\theta_{TH}{}^*$ calculated based on the torque ratio t established when the lockup clutch 15 is OFF (which will be called "lockup-OFF-time torque ratio") passes the lockup OFF line while the lockup clutch 15 is in the OFF state, it is determined that the current point in the lockup region diagram comes out of a hunting region in which switching hunting is likely to occur. Once this determination is made, an OFF to ON determination for the lockup clutch 15 is made using the lockup-OFF-time torque ratio t.

When the lockup clutch 15 is switched to the ON state as a result of an OFF to ON determination made based on the lockup-OFF-time torque ratio t, a subsequent ON to OFF determination is made based on the target throttle opening $\theta_{TH}{}^*$ that is derived from the target driving force F* according to the above equation (1) in which the lockup-OFF-time torque ratio t is used even if the lockup clutch 15 is currently in the ON state. If the target throttle opening $\theta_{TH}{}^*$ calculated using the lockup-ON-time torque ratio t (=1) passes the lockup ON line while the lockup clutch 15 is in the ON state, it is determined that the current point in the lockup region diagram comes out of a hunting region in which switching hunting is likely to occur. Once this determination is made, an ON to OFF determination for the lockup clutch 15 is made using the lockup-ON-time torque ratio t (=1).

The electronic control unit 80 calculates the lockup-OFF-time torque ratio t by using a static balance point of the torque converter. The static balance point is an experimental value obtained in advance as a torque ratio t that is established when the slip amount of the torque converter 14 becomes stable or settles with respect to the engine torque at a certain vehicle speed. Thus, a stable torque ratio t based on the turbine speed $N_T$, engine speed $N_E$, engine torque $T_E$, and so forth, can be used in the above-indicated equation (1) as the lockup-OFF-time torque ratio t.

Figure 8:
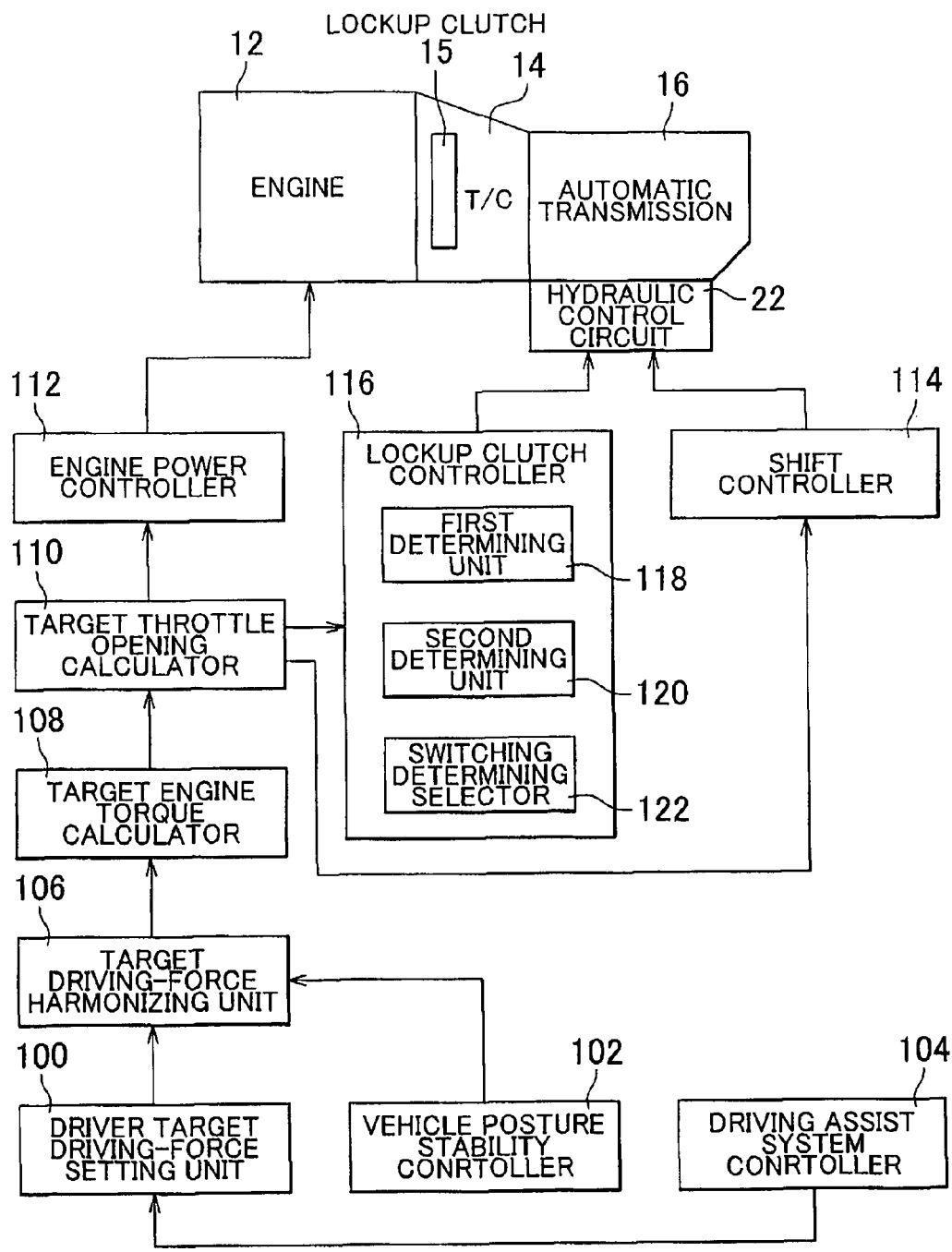
FIG. 8, which corresponds to FIG. 2, is a function block diagram that explains principal control functions of the electronic control unit of FIG. 1 according to another embodiment of the invention.

FIG. 8, which corresponds to FIG. 2, is a function block diagram that explains principal control functions performed by the electronic control unit 80. In FIG. 8, calculation of the target engine torque $T_E{}^*$ by the target engine torque calculator 108, calculation of the target throttle opening $\theta_{TH}{}^*$ by the target throttle opening calculator 110, and a means or method for preventing switching control hunting when the lockup clutch controller 116 switches the operating state of the lockup clutch 15 are mainly different from those of the first embodiment.

The target engine torque calculator 108 calculates the target engine torque $T_E{}^*$ using the lockup-ON-time torque ratio (=1) according to the above-indicated equation (1), and calculates the target engine torque $T_E^*$ using the lockup-OFF-time torque ratio t, according to the equation (1).

The target throttle opening calculator 110 calculates the target throttle opening $\theta_{TH}^*$ that provides the target engine torque $T_E^*$ calculated by the target engine torque calculator 108 using the lockup-ON-time torque ratio t (=1), and also calculates the target throttle opening $\theta_{TH}^*$ that provides the target engine torque $T_E^*$ calculated by using the lockup-OFF-time torque ratio t.

The lockup clutch controller 116 includes a first determining unit 118 that determines switching of the operating state of the lockup clutch 15, based on the actual vehicle speed $N_{OUT}$ and the target throttle opening $\theta_{TH}^*$ calculated by the target throttle opening calculator 110 using the lockup-ON-time torque ratio t (=1), from the lockup region diagram as shown in, for example, FIG. 7. The lockup clutch controller 116 also includes a second determining unit 120 that determines switching of the operating state of the lockup clutch 15, based on the actual vehicle speed $N_{OUT}$ and the target throttle opening $\theta_{TH}^*$ calculated by the target throttle opening calculator 110 using the lockup-OFF-time torque ratio t, from the lockup region diagram of FIG. 7. The lockup clutch controller 116 generates a lockup switching command signal for switching the lockup clutch 15 to the operating state determined by either the first determining unit 118 or the second determining unit 120, to the hydraulic control circuit 22.

The lockup clutch controller 116 further includes a switching determination selector 122. If one of the first determining unit 118 and the second determining unit 120 determines switching of the operating state of the lockup clutch 15, and the same switching of the operating state as that determined by the above-indicated one determining unit is subsequently determined by the other determining unit, the switching determination selector 122 selects a determination made by the other determining unit as a subsequent effective determination about switching of the operating state of the lockup clutch 15. When the lockup clutch 15 is switched to the operating state determined by one of the first determining unit 118 and the second determining unit 120, and the switching determination selector 122 then selects a determination made by the other determining unit as an effective determination about switching of the operating state of the lockup clutch 15, the lockup clutch controller 116 generates a lockup switching command signal for switching the lockup clutch 15 to the operating state determined by the other determining unit, to the hydraulic control circuit 22.

In other words, when the lockup clutch controller 116 switches the lockup clutch 15 to the operating state determined by one of the first determining unit 118 and the second determining unit 120, the controller 116 continues to generate a lockup switching command signal to the hydraulic control circuit 22 so as to switch the lockup clutch 15 to the operating state determined by the above-indicated one determining unit until the switching determination selector 122 switches from the one determining unit to the other determining unit to determine switching of the operating state of the lockup clutch 15, namely, selects a determination made by the other determining unit as an effective determination about switching of the operating state of the lockup clutch 15.

Figure 9:
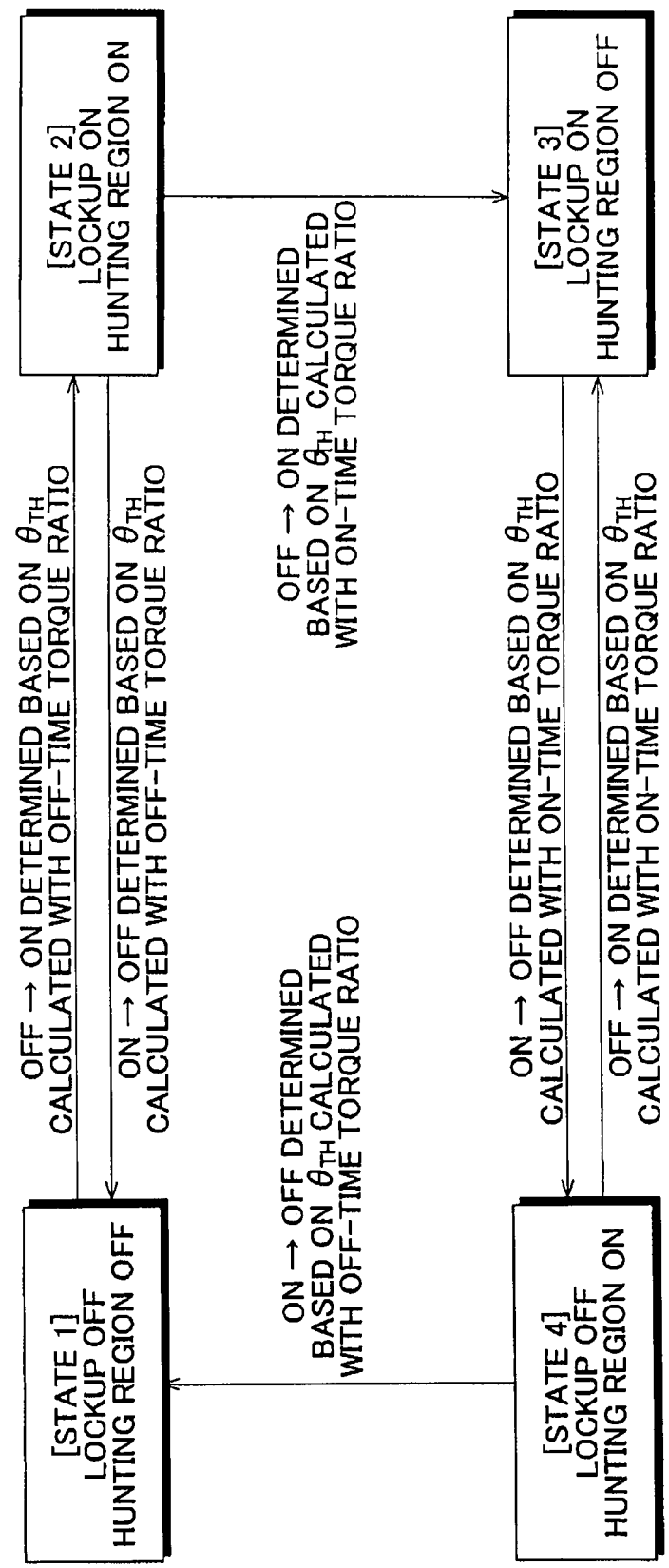
FIG. 9 is a state transition diagram showing transitions of the operating state of the lockup clutch, for explaining control operations for preventing switching control hunting.

FIG. 9 is a state transition diagram indicating the flow of the control operation for preventing switching control hunting by illustrating changes in the operating state of the lockup clutch 15. In the following description, specific operations of the lockup clutch controller 116 will be explained with reference to FIG. 9.

In FIG. 9, [STATE 1] represents a state in which the lockup clutch 15 is placed in the OFF state by the lockup clutch controller 116, and the current point in the lockup region diagram lies outside the hunting region (hunting region OFF). In this [STATE 1], the second determining unit 120 determines switching of the lockup clutch 15 from OFF to ON from the lockup region diagram, based on the actual vehicle speed $N_{OUT}$ and the target throttle opening $\theta_{TH}^*$ using the lockup-OFF-time torque ratio t.

If the second determining unit 120 determines switching from OFF to ON in [STATE 1], the lockup clutch controller 116 switches the lockup clutch 15 to the ON state, for a transition from [STATE 1] to [STATE 2].

In [STATE 2], switching control hunting may occur if the first determining unit 118 determines switching of the lockup clutch 15 from ON to OFF from the lockup region diagram, based on the actual vehicle speed $N_{OUT}$ and the target throttle opening $\theta_{TH}^*$ using the lockup-ON-time torque ratio t (=1). Namely, the current point in the lockup region diagram lies within the hunting region (hunting region ON). Accordingly, the second determining unit 120 makes an ON to OFF determination, i.e., determines whether the lockup clutch 15 should be switched from ON to OFF, until the same switching of the lockup clutch 15 from OFF to ON as that determined by the second determining unit 120 is determined by the first determining unit 118, and the switching determination selector 122 switches from the second determining unit 120 to the first determining unit 118 to select a determination made by the first determining unit 118 about switching of the operating state of the lockup clutch 15.

If the second determining unit 120 determines switching of the lockup clutch 15 from ON to OFF in [STATE 2], the lockup clutch controller 116 switches the lockup clutch 15 to the OFF state, namely, effects a transition from [STATE 2] to [STATE 1] in FIG. 9. If the first determining unit 118 determines switching from OFF to ON in [STATE 2], the switching determination selector 122 switches from the second determining unit 120 to the first determining unit 118 to select a switching determination made by the first determining unit 118, for a transition from [STATE 2] to [STATE 3].

In [STATE 3], the lockup clutch 15 is placed in the ON state by the lockup clutch controller 116, and the current point in the lockup region diagram lies outside the hunting region (hunting region OFF). In this [STATE 3], the first determining unit 118 makes an ON to OFF determination, namely, determines whether the lockup clutch 15 should be switched from ON to OFF.

If the first determining unit 118 determines switching of the lockup clutch 15 from ON to OFF in [STATE 3], the lockup clutch controller 116 switches the lockup clutch 15 to the OFF state, to effect a transition from [STATE 3] to [STATE 4].

In [STATE 4], switching control hunting may occur if the second determining unit 120 determines switching of the lockup clutch 15 from OFF to ON. Namely, the current point in the lockup region diagram lies within the hunting region (hunting region ON). Accordingly, the first determining unit 118 makes an OFF to ON determination, i.e., determines whether the lockup clutch 15 should be switched from OFF to ON, until the same switching of the lockup clutch 15 from ON to OFF as that determined by the first determining unit 118 is determined by the second determining unit 120, and the switching determination selector 122 switches from the first determining unit 118 to the second determining unit 120 to select a determination made by the second determining unit 120 about switching of the operating state of the lockup clutch 15.

If the first determining unit 118 determines switching of the lockup clutch 15 from OFF to ON in [STATE 4], the lockup clutch controller 116 switches the lockup clutch 15 to the ON state, namely, effects a transition from [STATE 4] to [STATE 3] in FIG. 9. If the second determining unit 120 determines switching from ON to OFF, the switching determination selector 122 switches from the first determining unit 118 to the second determining unit 120 to select a switching determination made by the second determining unit 120, for a transition from [STATE 4] to [STATE 1].

In the second embodiment as described above, the first determining unit 118 determines switching of the operating state of the lockup clutch 15 from the lockup region diagram, based on the actual vehicle speed $N_{OUT}$ and the target throttle opening $\theta_{TH}*$ using the lockup-ON-time torque ratio t (=1), and the second determining unit 120 determines switching of the operating state of the lockup clutch 15 from the lockup region diagram, based on the actual vehicle speed $N_{OUT}$ and the target throttle opening $\theta_{TH}*$ using the lockup-OFF-time torque ratio t. If one of the first and second determining units 118, 120 determines that the lockup clutch 15 should be switched from ON to OFF or OFF to ON, and the same switching of the operating state of the lockup clutch 15 as that determined by the above-indicated one determining unit is subsequently determined by the other determining unit, the switching determination selector 122 selects a determination made by the other determining unit as a subsequent effective determination about switching of the operating state of the lockup clutch 15. Accordingly, the other determining unit is prevented from determining switching of the operating state of the lockup clutch 15 in the opposite direction (i.e., switching back to the operating state prior to switching determined by the above-indicated one determining unit) immediately after the lockup clutch 15 is switched to the operating state determined by the one determining unit. Thus, the lockup clutch 15 is prevented from being switched back to the operating state opposite to that determined by the one determining unit, and switching control hunting of the lockup clutch 15 is thus prevented.

Namely, when one of the first and second determining units 118, 120 determines that the lockup clutch 15 should be switched from ON to OFF or OFF to ON, the other determining unit is kept or inhibited from determining switching of the operating state in the opposite direction until the other determining unit determines the same switching of the operating state as that determined by the one determining unit. Thus, the lockup clutch 15 is prevented from being switched to the operating state opposite to that determined by the above-indicated one determining unit, and switching control hunting of the lockup clutch 15 is thus prevented.

Also, according to the second embodiment, the switching lines in the lockup region diagram consist of a lockup ON line and a lockup OFF line, and space that accommodates hysteresis is provided between the lockup ON line and the lockup OFF line. With this arrangement, switching control hunting of the lockup clutch 15 is further prevented.

Third Embodiment

In this embodiment, a control operation that is different from those of the first and second embodiments is performed so as to prevent switching control hunting of the lockup clutch 15. The control operation of the third embodiment will be hereinafter explained in detail.

In this embodiment, switching control hunting is prevented by determining switching of the operating state of the lockup clutch 15 using the driving force F instead of the throttle opening $\theta_{TH}$. Namely, the process of determining switching of the operating state of the lockup clutch 15 excludes a process of converting the target driving force F* into the target throttle opening $\theta_{TH}*$, so as to avoid an influence of the torque ratio t and prevent switching control hunting.

Figure 10:
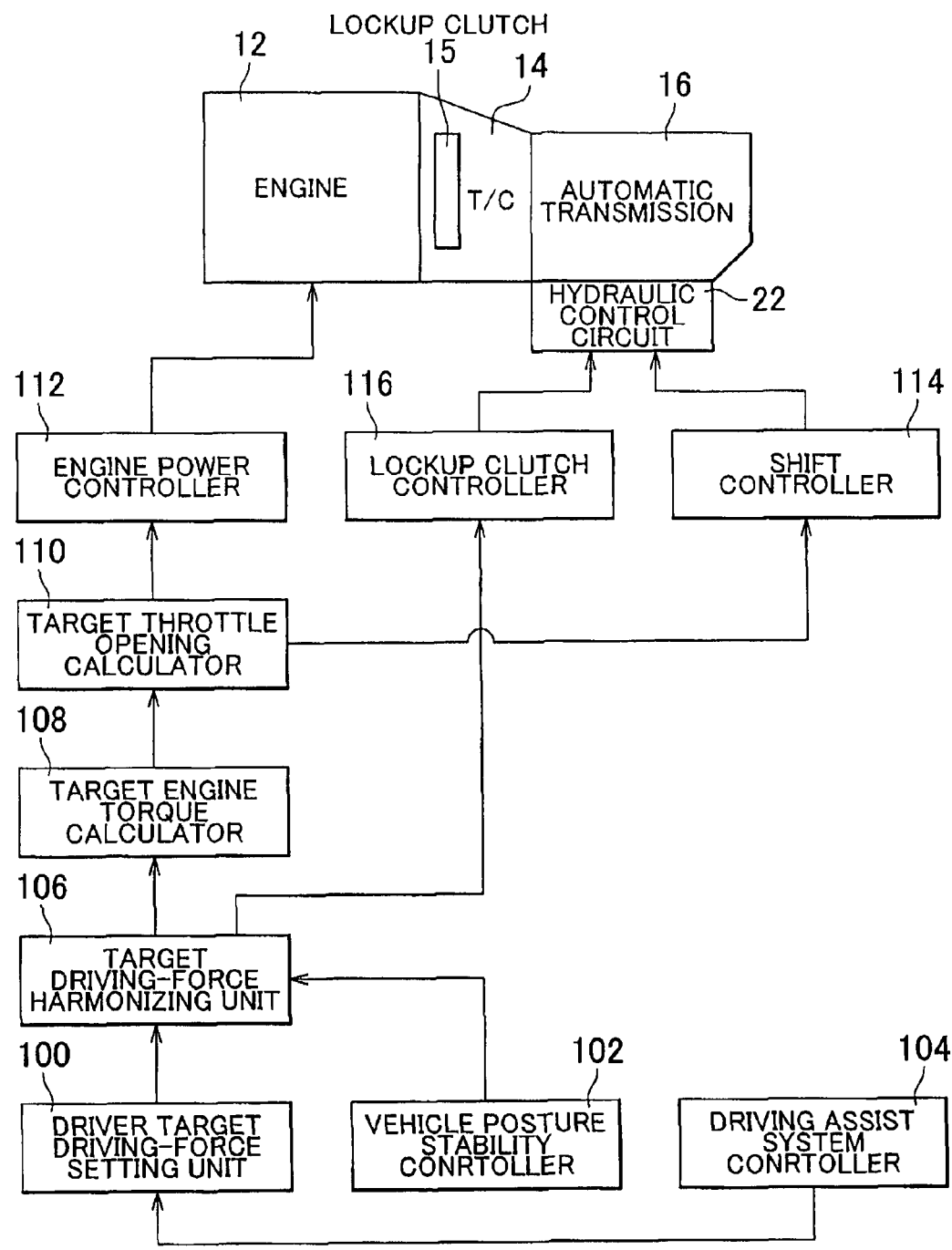
FIG. 10, which corresponds to FIG. 2, is a function block diagram that explains principal control functions of the electronic control unit of FIG. 1 according to a further embodiment of the invention.

FIG. 10, which corresponds to FIG. 2, is a function block diagram that explains principal control functions performed by the electronic control unit 80. In FIG. 10, a means or method for preventing switching control hunting when the lockup clutch controller 116 performs switching of the operating state of the lockup clutch 15 is mainly different from those of the first and second embodiments.

Figure 11:
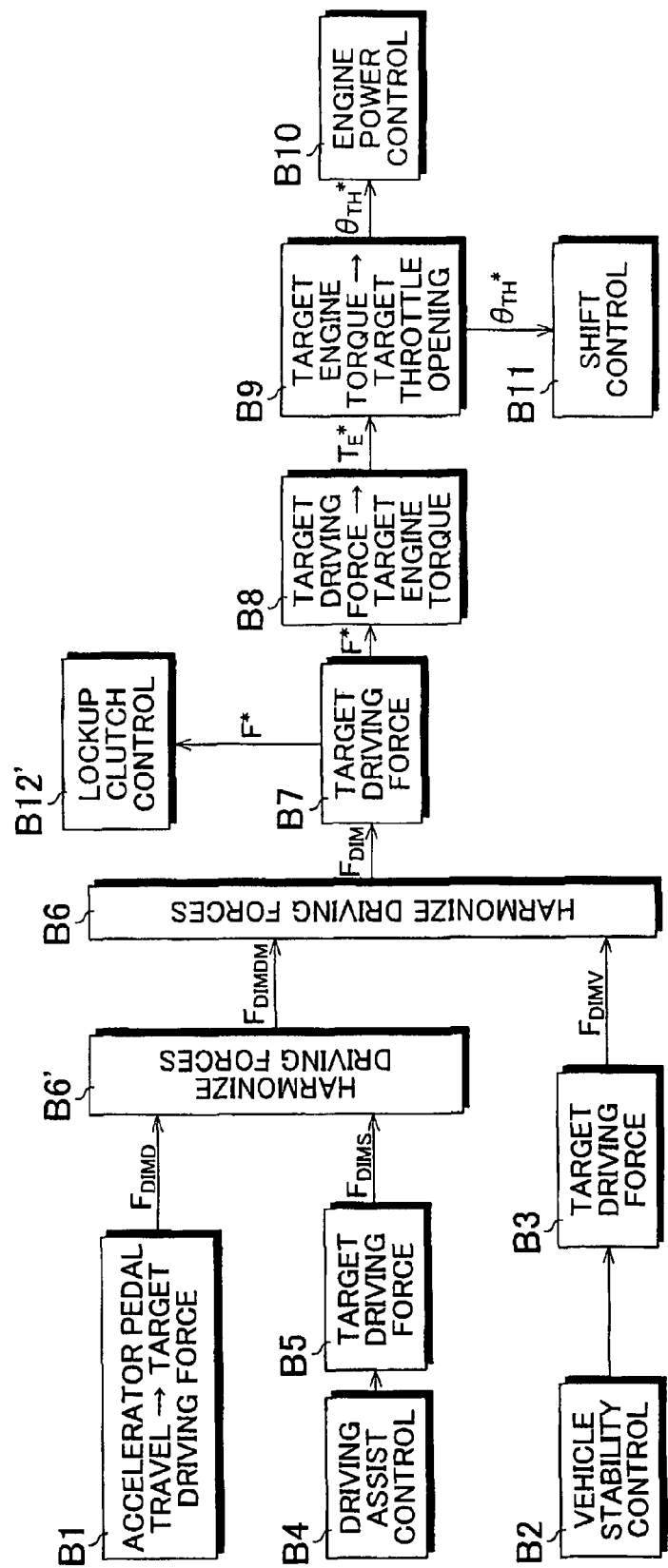
FIG. 11, which corresponds to FIG. 3, is a block diagram schematically showing the flow of control of the electronic control unit of FIG. 1, including, for example, setting of a target driving force, calculation of a target throttle opening for use in power control of the engine, power control of the engine, judgment on shifting of the automatic transmission, and judgment on switching of the operating state of the lockup clutch.

FIG. 11 is a block diagram schematically showing the flow of control of the electronic control unit 80. FIG. 11 is different from FIG. 3 in that block B12 of FIG. 3 is replaced by block B12' that receives the target driving force F* from block B7. In the following, no explanation will be provided for each block of FIG. 11 other than block B12'.

Figure 12:
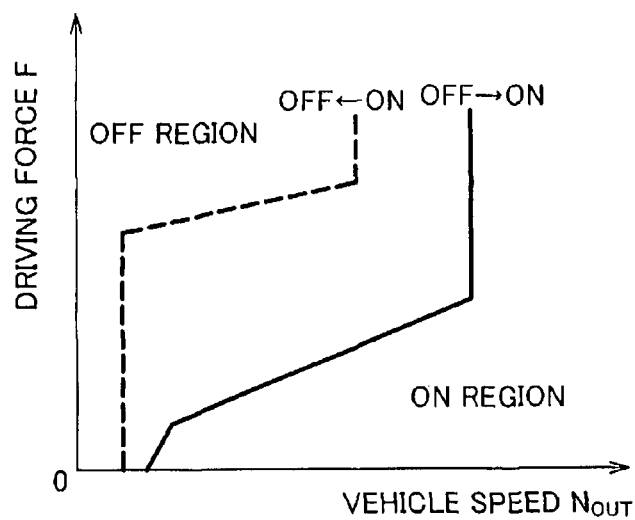
FIG. 12, which corresponds to FIG. 7, is a lockup region diagram stored in advance and having a lockup OFF region and a lockup ON region in a two-dimensional coordinate system having the vehicle speed and the driving force as variables, which diagram is used for switching control of the lockup clutch performed by the electronic control unit of FIG. 1.

The lockup clutch controller 116, which corresponds to block B12' of FIG. 11, determines, only during acceleration of the vehicle, whether the vehicle operating conditions represented by the actual vehicle speed $N_{OUT}$ and the target driving force F* set by the target driving-force harmonizing unit 106 belong to an engagement (lockup ON) region or a release (lockup OFF) region, from a relationship (map, lockup region diagram) as shown in, for example, FIG. 12. The lockup region diagram of FIG. 12, which is stored in advance in the electronic control unit 80, is a two-dimensional coordinate system using the vehicle speed $N_{OUT}$ and the driving force F as variables and having the release (lockup OFF) region and the engagement (lockup ON) region. The lockup clutch controller 116 then generates a lockup switching command signal for switching the operating state of the lockup clutch 15, to the hydraulic control circuit 22, so as to bring the lockup clutch 15 into the operating state of the determined region.

In the lockup region diagram of FIG. 12, which corresponds to the lockup region diagram of FIG. 7, the solid line indicates a switching line (lockup ON line) used for making a lockup ON determination, and the broken line indicates a switching line (lockup OFF line) used for making a lockup OFF determination. Thus, the switching lines in FIG. 12 have the lockup ON line and the lockup OFF line, and space that accommodates hysteresis is provided between the lockup ON line and the lockup OFF line, so as to prevent switching control hunting from occurring between lockup ON determinations and lockup OFF determinations. The lockup region diagram of FIG. 12 is not derived from that of FIG. 7, namely, is not obtained by converting the throttle opening $\theta_{TH}$ as one of the variables of the lockup region diagram of FIG. 7 into the driving force, but sets the operating regions of the lockup clutch 15 by directly using the vehicle speed $N_{OUT}$ and the driving force F as variables. Thus, the use of the lockup region diagram of FIG. 12 for determination on switching of the lockup clutch 15 makes it possible to prevent switching control hunting.

According to the third embodiment, the lockup clutch controller 116 switches the operating state of the lockup clutch 15 based on the actual vehicle speed $N_{OUT}$ and the target driving force F*, with reference to the stored lockup region diagram having the vehicle speed $N_{OUT}$ and the driving force F as variables, as described above. Accordingly, a problem arising from changes in the torque ratio t, which would otherwise occur at the time of conversion from the driving force F into the throttle opening $\theta_{TH}$, can be avoided, and switching control hunting of the lockup clutch 15 can be thus prevented.

Fourth Embodiment

In this embodiment, a control operation that is different from those of the first through third embodiments is performed so as to prevent switching control hunting of the lockup clutch 15. The control operation of the fourth embodiment will be hereinafter explained in detail.

When the lockup region diagram of FIG. 12 is employed as in the above-described third embodiment, switching control hunting may be prevented, but the result of determination about switching of the lockup clutch 15 does not reflect the target throttle opening $\theta_{TH}$* that provides the target engine torque $T_E$* derived from the target driving force F*, and is thus less likely to reflect the operating conditions of the engine 12. Namely, the engine characteristics are less likely to be seen or observed from the result of switching determination.

In the fourth embodiment, therefore, switching of the operating state of the lockup clutch 15 is determined by using the driving force F in place of the throttle opening $\theta_{TH}$, as in the third embodiment, but the driving force F that is derived from the throttle opening $\theta_{TH}$ as one of the variables in the lockup region diagram of FIG. 7 is used as the driving force F as one of the variables in the lockup region diagram of FIG. 12. Namely, switching of the lockup clutch 15 is determined from a lockup region diagram that is plotted based on the lockup region diagram of FIG. 7, using the vehicle speed $N_{OUT}$ and the driving force F as variables.

Figure 13:
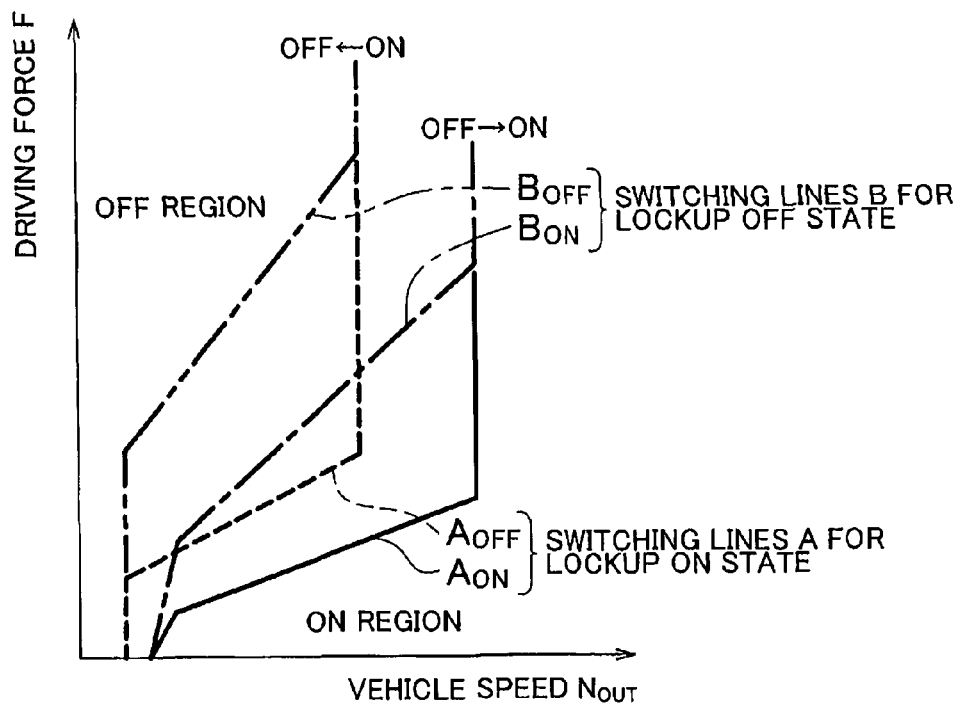
FIG. 13 is a lockup region diagram derived from the lockup region diagram of FIG. 7, which contains lockup-ON switching lines plotted using the lockup-ON-time torque ratio and lockup-OFF switching lines plotted using the lockup-OFF-time torque ratio in a two-dimensional coordinate system having the vehicle speed and the driving force as variables.

FIG. 13 shows one example of lockup region diagram in the form of a two-dimensional coordinate system having the vehicle speed $N_{OUT}$ and the driving force F as variables, which diagram is derived from the lockup region diagram of, for example, FIG. 7 through conversion of the throttle opening $\theta_{TH}$ into the driving force F. The lockup region diagram of FIG. 13 contains a pair of switching lines A, i.e., a lockup ON line $A_{ON}$ indicated by the solid line and a lockup OFF line $A_{OFF}$ indicated by the broken line, which are plotted through conversion based on the lockup-ON-time torque ratio t (=1) established when the lockup clutch 15 is in the ON state. The lockup region diagram of FIG. 13 also contains a pair of switching lines B, i.e., a lockup ON line $B_{ON}$ indicated by the one-dot chain line and a lockup OFF line $B_{OFF}$ indicated by the two-dot chain line, which are plotted through conversion based on the lockup-OFF-time torque ratio t established when the lockup clutch 15 is in the OFF state. It is to be noted that the target throttle opening $\theta_{TH}$* (or target engine torque $T_E$*) is converted into the target driving force F* according to an inverse function of the above-indicated equation (1).

Figure 22:
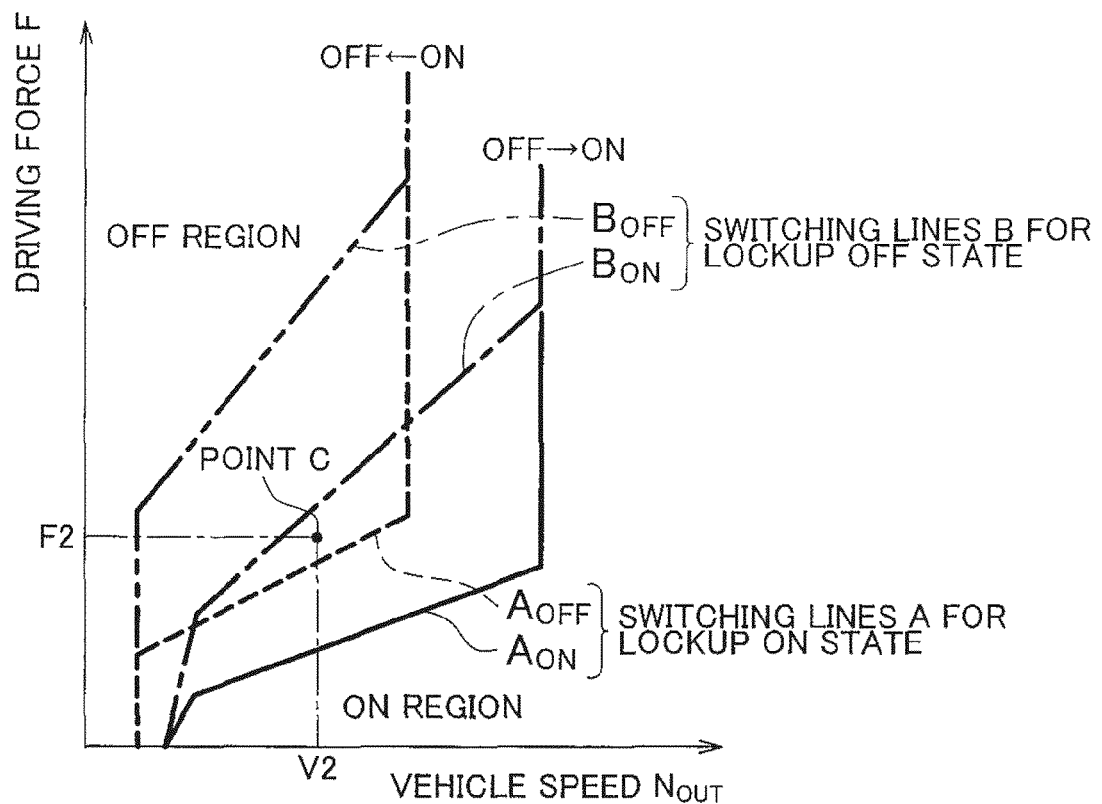
FIG. 22 is a lockup region diagram that contains lockup-ON switching lines plotted using the lockup-ON-time torque ratio and lockup-OFF switching lines plotted using the lockup-OFF-time torque ratio in a two-dimensional coordinate system having the axis indicating the vehicle speed and the axis indicating the driving force, for explaining a situation where switching control hunting occurs, in a different manner from that of FIG. 21.

If the lockup region diagram of FIG. 13 is employed, however, switching control hunting may occur as described above with reference to FIG. 22. More specifically, in certain vehicle conditions represented by a certain vehicle speed $N_{OUT}$ and a certain target driving force F*, the switching lines B are applied when the lockup clutch 15 is in the OFF state, and a point in the lockup region diagram of FIG. 13, which corresponds to the above vehicle conditions, may pass the lockup ON line $B_{ON}$ to make a lockup ON determination, depending upon the target driving force F* and the torque ratio. Once the lockup clutch 15 is placed in the ON state, the switching line A are applied, and the same point in the lockup region diagram of FIG. 13 may pass the lockup OFF line $A_{OFF}$ to make a lockup OFF determination. Thus, the use of the lockup region diagram of FIG. 13 may result in switching control hunting.

In the fourth embodiment, therefore, when the lockup region diagram of FIG. 13 is used in the control illustrated in the function block diagram of FIG. 10 and the block diagram of FIG. 11 of the third embodiment, the torque t is fixed as in the first embodiment, and the lockup region diagram of FIG. 13 is plotted on the basis of the lockup region diagram of FIG. 7 by converting the target throttle opening $\theta_{TH}$* into the target driving force F* using the fixed torque t. The resulting lockup region diagram contains only a single pair of switching lines (one lockup ON line and one lockup OFF line), and, therefore, switching control hunting of the lockup clutch 15 is prevented. In the case where the torque t is fixed, however, substantially the same result as that of the third embodiment is obtained.

According to the fourth embodiment as described above, the torque t is fixed when the lockup region diagram stored in advance in the form of a two-dimensional coordinate system having the vehicle speed $N_{OUT}$ and the target throttle opening $\theta_{TH}$ as variables is converted into the lockup region diagram stored in advance in the form of a two-dimensional coordinate system having the vehicle speed $N_{OUT}$ and the driving force F as variables. Accordingly, the lockup clutch controller 116 determines switching of the operating state of the lockup clutch 15 based on the actual vehicle speed $N_{OUT}$ and the target driving force F*, from the lockup region diagram having the vehicle speed $N_{OUT}$ and the driving force F as variables, which diagram is free from an influence of changes in, for example, the operating state of the lockup clutch 15. Thus, switching control hunting of the lockup clutch 15 is prevented.

Fifth Embodiment

In this embodiment, a control operation that is different from those of the first through fourth embodiments is performed so as to prevent switching control hunting of the lockup clutch 15. The control operation of the fifth embodiment will be hereinafter explained in detail.

In this embodiment, a control operation similar to that of the second embodiment is performed in the case where the lockup region diagram of FIG. 13 is used in the control flow of the block diagram of FIG. 11 as in the fourth embodiment, so as to prevent switching control hunting of the lockup clutch 15.

More specifically, when the lockup clutch 15 is switched to the OFF state as a result of an ON to OFF determination based on the lockup-ON-time switching lines A employed when the lockup clutch 15 is ON, a subsequent OFF to ON determination is made based on the lockup-ON-time switching lines A even if the lockup clutch 15 is currently not in the ON state. At this time, if the operating point determined by the vehicle speed $N_{OUT}$ and the driving force F in the lockup region diagram of FIG. 13 passes the lockup OFF line $B_{OFF}$ of the lockup-OFF-time switching lines B, it is judged that the operating point comes out of a hunting region, and a subsequent OFF to ON determination is made based on the lockup-OFF-time switching lines B.

When the lockup clutch 15 is switched to the ON state as a result of an OFF to ON determination based on the lockup-OFF-time switching lines B, on the other hand, a subsequent ON to OFF determination is made based on the lockup-OFF-time switching lines B even if the lockup clutch 15 is currently not in the OFF state. At this time, if the operating point determined by the vehicle speed $N_{OUT}$ and the driving force F in the lockup region diagram of FIG. 13 passes the lockup ON line $A_{ON}$ of the lockup-ON-time switching lines A, it is judged that the operating point comes out of a hunting region, and a subsequent ON to OFF determination is made based on the lockup-ON-time switching lines A.

The electronic control unit 80 calculates the lockup-OFF-time torque ratio t by using a static balance point of the torque converter in the same manner as in the second embodiment. The electronic control unit 80 may store the switching lines A and switching lines B of FIG. 13 in advance in the form of a map (relationship) plotted in a two-dimensional coordinate system having the vehicle speed $N_{OUT}$ and the driving force F as variables, using the torque ratio t as a parameter, or may convert a target throttle opening $\theta_{TH}^*$ into a target driving force F* in real time for use as a judgment value based on which switching of the operating state of the lockup clutch 15 is executed.

Figure 14:
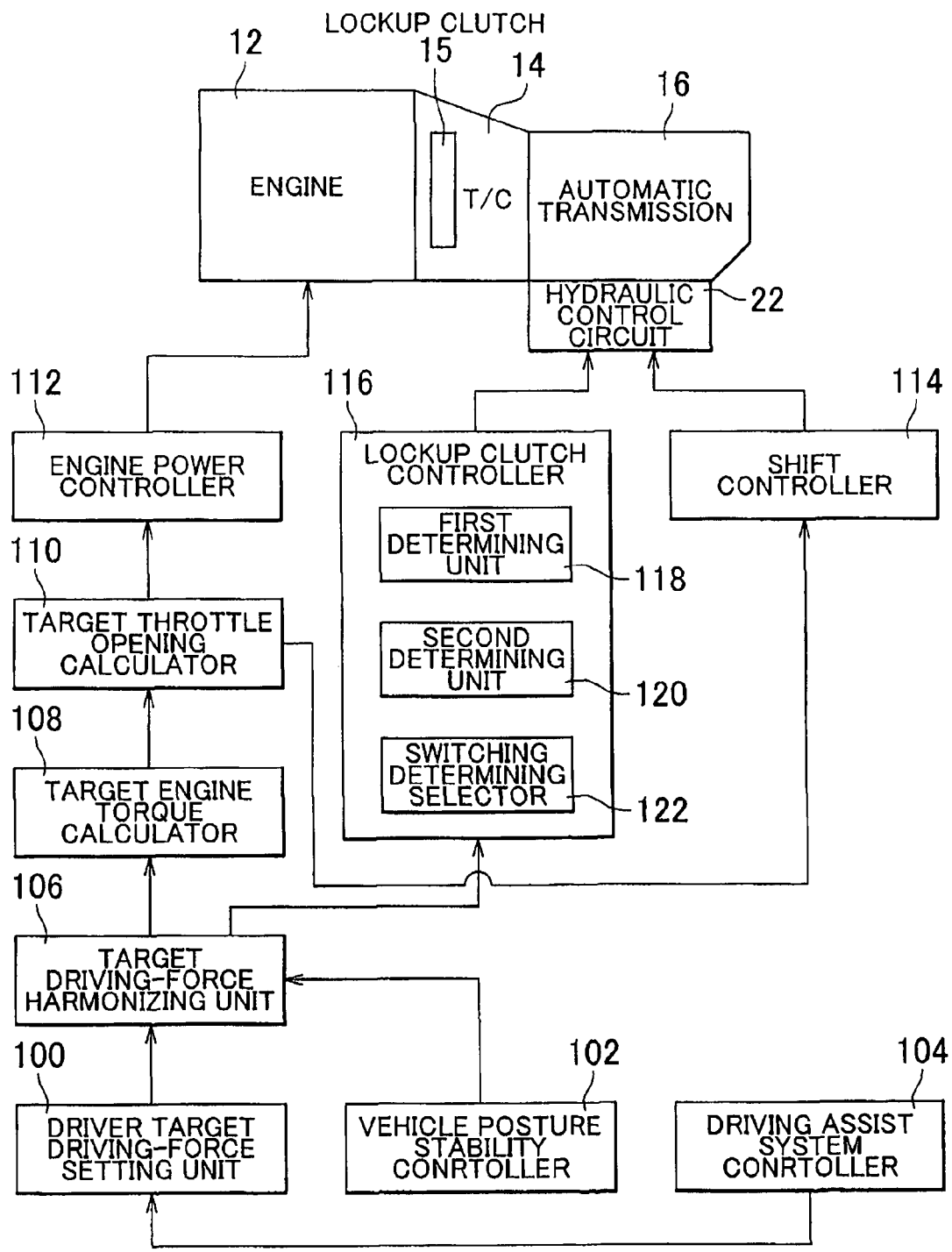
FIG. 14, which corresponds to FIG. 10, is a function block diagram that explains principal control functions of the electronic control unit of FIG. 1.

FIG. 14, which corresponds to FIG. 10, is a function block diagram that explains principal control functions of the electronic control unit 80. In FIG. 14, a means or method for preventing switching control hunting when the lockup clutch controller 116 switches the operating state of the lockup clutch 15 is mainly different from those of the first through fourth embodiments.

The lockup clutch controller 116, which corresponds to block B12' of FIG. 11, includes a first determining unit 118 that determines switching of the operating state of the lockup clutch 15 while the vehicle is accelerating, from the lockup-ON-time switching lines A in the lockup region diagram of, for example, FIG. 13, based on the actual vehicle speed $N_{OUT}$ and the target driving force F* set by the target driving-force harmonizing unit 106. The lockup clutch controller 116 also includes a second determining unit 120 that determines switching of the operating state of the lockup clutch 15 from the lockup-OFF-time switching lines B in the same lockup region diagram, based on the actual vehicle speed $N_{OUT}$ and the target driving force F* set by the target driving-force harmonizing unit 106. In operation, the lockup clutch controller 116 generates a lockup switching command signal for switching the lockup clutch 15 to the operating state determined by either the first determining unit 118 or the second determining unit 120, to the hydraulic control circuit 22.

The lockup clutch controller 116 further includes a switching determination selector 122. If one of the first determining unit 118 and the second determining unit 120 determines switching of the operating state of the lockup clutch 15 from ON to OFF or vice versa, and the same switching of the operating state as that determined by the above-indicated one determining unit is subsequently determined by the other determining unit, the switching determination selector 122 selects a determination made by the other determining unit as a subsequent effective determination about switching of the operating state of the lockup clutch 15. When the lockup clutch 15 is switched to the operating state determined by one of the first determining unit 118 and the second determining unit 120, and the switching determination selector 122 then selects a determination made by the other determining unit as an effective determination about switching of the operating state of the lockup clutch 15, the lockup clutch controller 116 generates a lockup switching command signal for switching the lockup clutch 15 to the operating state determined by the other determining unit, to the hydraulic control circuit 22.

In other words, when the lockup clutch controller 116 switches the lockup clutch 15 to the operating state determined by one of the first determining unit 118 and the second determining unit 120, the controller 116 continues to generate a lockup switching command signal to the hydraulic control circuit 22 so as to switch the lockup clutch 15 to the operating state determined by the above-indicated one determining unit until the switching determination selector 122 switches from the one determining unit to the other determining unit to determine switching of the operating state of the lockup clutch 15, namely, selects a determination made by the other determining unit as an effective determination about switching of the operating state of the lockup clutch 15.

Figure 15:
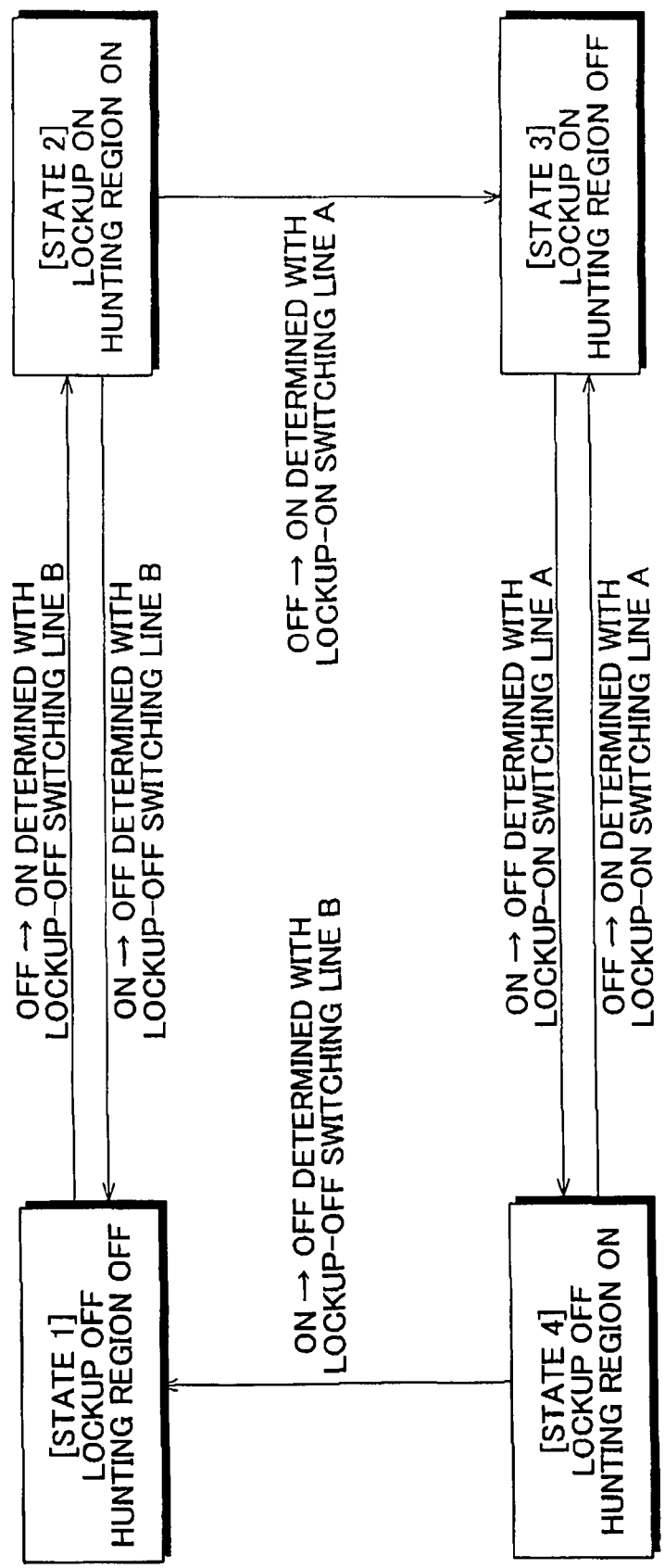
FIG. 15 is a state transition diagram showing transitions of the operating state of the lockup clutch, for explaining control operations for preventing switching control hunting when the lockup region diagram of FIG. 13 is used.

FIG. 15 is a state transition diagram indicating the flow of the control operation for preventing switching control hunting by illustrating changes in the operating state of the lockup clutch 15 in the case where the lockup region diagram of FIG. 13 is used. In the following description, specific operations of the lockup clutch controller 116 will be explained with reference to FIG. 15.

In FIG. 15, [STATE 1] represents a state in which the lockup clutch 15 is placed in the OFF state by the lockup clutch controller 116, and the current point in the lockup region diagram of FIG. 13 lies outside a hunting region (hunting region OFF). In this [STATE 1], the second determining unit 120 determines switching of the lockup clutch 15 from OFF to ON based on the actual vehicle speed $N_{OUT}$ and the target driving force F*, using the lockup-OFF-time switching lines B, more specifically, the lockup ON line $B_{ON}$, in the lockup region diagram of FIG. 13.

If the second determining unit 120 determines that the lockup clutch 15 should be switched from OFF to ON in [STATE 1], the lockup clutch controller 116 switches the lockup clutch 15 to the ON state to effect a transition from [STATE 1] to [STATE 2].

In [STATE 2], switching control hunting may occur if the first determining unit 118 determines switching of the lockup clutch 15 from ON to OFF, based on the actual vehicle speed $N_{OUT}$ and the target diving force F*, using the lockup-ON-time switching lines A in the lockup region diagram of FIG. 13. Namely, the current point in the lockup region diagram lies within the bunting region (hunting region ON). Accordingly, the second determining unit 120 makes an ON to OFF determination, i.e., determines whether the lockup clutch 15 should be switched from ON to OFF, until the same switching of the lockup clutch 15 from OFF to ON as that determined by the second determining unit 120 is determined by the first determining unit 118, and the switching determination selector 122 switches from the second determining unit 120 to the first determining unit 118 to select a determination made by the first determining unit 118 as an effective determination about switching of the operating state of the lockup clutch 15.

If the second determining unit 120 determines that the lockup clutch 15 should be switched from ON to OFF in [STATE 2], the lockup clutch controller 116 switches the lockup clutch 15 to the OFF state, namely, effects a transition from [STATE 2] to [STATE 1] in FIG. 15. If the first determining unit 118 determines switching from OFF to ON in [STATE 2], the switching determination selector 122 switches from the second determining unit 120 to the first determining unit 118 to select a determination made by the first determining unit 118 as an effective determination about switching of the operating state of the lockup clutch 15, namely, a transition from [STATE 2] to [STATE 3] is effected.

In [STATE 3], the lockup clutch 15 is placed in the ON state by the lockup clutch controller 116, and the current point in the lockup region diagram of FIG. 13 lies outside the hunting region (hunting region OFF). In this [STATE 3], the first determining unit 118 makes an ON to OFF determination, namely, determines whether the lockup clutch 15 should be switched from ON to OFF.

If the first determining unit 118 determines switching of the lockup clutch 15 from ON to OFF in [STATE 3], the lockup clutch controller 116 switches the lockup clutch 15 to the OFF state, to effect a transition from [STATE 3] to [STATE 4].

In [STATE 4], switching control hunting may occur if the second determining unit 120 determines switching of the lockup clutch 15 from OFF to ON. Namely, the current point in the lockup region diagram of FIG. 13 lies within the hunting region (hunting region ON). Accordingly, the first determining unit 118 makes an OFF to ON determination, i.e., determines whether the lockup clutch 15 should be switched from OFF to ON, until the second determining unit 120 determines the same switching of the lockup clutch 15 from ON to OFF as that determined by the first determining unit 118, and the switching determination selector 122 switches from the first determining unit 118 to the second determining unit 120 to select a determination made by the second determining unit 120 as an effective determination about switching of the operating state of the lockup clutch 15.

If the first determining unit 118 determines that the lockup clutch 15 should be switched from OFF to ON in [STATE 4], the lockup clutch controller 116 switches the lockup clutch 15 to the ON state, namely, effects a transition from [STATE 4] to [STATE 3] in FIG. 15. If the second determining unit 120 determines switching from ON to OFF, the switching determination selector 122 switches from the first determining unit 118 to the second determining unit 120 to select a determination made by the second determining unit 120 as an effective determination about switching of the operating state of the lockup clutch 15, for a transition from [STATE 4] to [STATE 1].

In the fifth embodiment as described above, the first determining unit 118 determines switching of the operating state of the lockup clutch 15, using the lockup-ON-time switching lines A, and the second determining unit 120 determines switching of the operating state of the lockup clutch 15, using the lockup-OFF-time switching lines B. If one of the first and second determining units 118, 120 determines that the lockup clutch 15 should be switched from ON to OFF or OFF to ON, and the same switching of the operating state of the lockup clutch 15 as that determined by the above-indicated one determining unit is subsequently determined by the other determining unit, the switching determination selector 122 selects a determination made by the other determining unit as a subsequent effective determination about switching of the operating state of the lockup clutch 15. Accordingly, the other determining unit is prevented from determining switching of the operating state of the lockup clutch 15 in the opposite direction (i.e., switching back to the operating state prior to switching determined by the above-indicated one determining unit) immediately after the lockup clutch 15 is switched to the operating state determined by the one determining unit. Thus, the lockup clutch 15 is prevented from being switched back to the operating state opposite to that determined by the one determining unit, and switching control hunting of the lockup clutch 15 is thus prevented.

Namely, when one of the first and second determining units 118, 120 determines that the lockup clutch 15 should be switched from ON to OFF or OFF to ON, the other determining unit is kept or inhibited from determining switching of the operating state in the opposite direction until the other determining unit determines the same switching of the operating state as that determined by the one determining unit. Thus, the lockup clutch 15 is prevented from being switched to the operating state opposite to that determined by the above-indicated one determining unit, and switching control hunting of the lockup clutch 15 is thus prevented.

In the fifth embodiment, the lockup region diagram is plotted based on the vehicle conditions represented by the target throttle opening $\theta_{TH}^*$ and the vehicle speed $N_{OUT}$. By converting the throttle opening $\theta_{TH}$ into the driving force F, therefore, switching of the operating state of the lockup clutch 15 is controlled based on the target driving force F*.

Also, according to the fifth embodiment, each pair of switching lines (A, B) in the lockup region diagram consist of a lockup ON line and a lockup OFF line, and space that accommodates hysteresis is provided between the lockup ON line and the lockup OFF line. With this arrangement, switching control hunting of the lockup clutch 15 is further prevented.

Sixth Embodiment

In this embodiment, a control operation for preventing switching control hunting with improved reliability is performed with regard to the fourth or fifth embodiment as described above.

Figure 16:
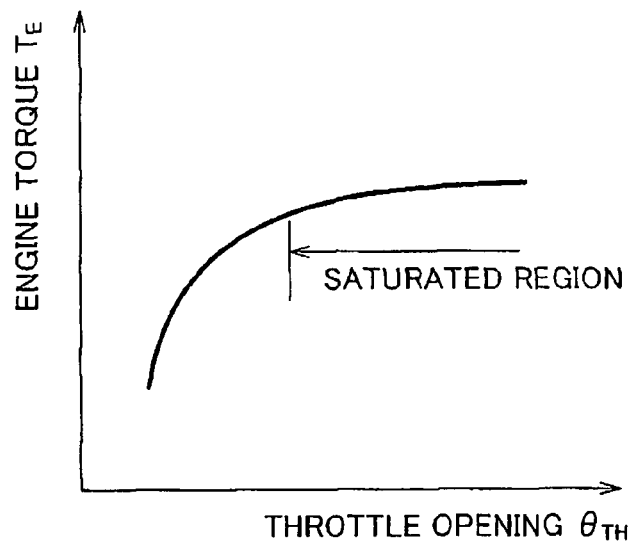
FIG. 16 is a graph indicating engine characteristics in the case where the engine torque has a saturated region with respect to the throttle opening.

In the fourth and fifth embodiments, the lockup region diagram as shown in FIG. 13 is plotted based on switching lines on a two-dimensional coordinate system having the vehicle speed $N_{OUT}$ and the throttle opening $\theta_{TH}$ as variables, by converting the throttle opening $\theta_{TH}$ into the driving force F and thus converting the switching lines into switching lines on a two-dimensional coordinate system having the vehicle speed $N_{OUT}$ and the driving force F as variables. Therefore, if there is a saturated region of the engine torque $T_E$ with respect to the throttle opening $\theta_{TH}$ as is the case with the engine characteristics as shown in FIG. 16, for example, the driving force F derived from the throttle opening $\theta_{TH}$ does not vary in the saturated region as much as that in regions other than the saturated region. As a result, space that accommodates hysterisis, which is provided between the lockup ON line indicated by the solid line and the lockup OFF line indicated by the broken line in the lockup region diagram as shown in FIG. 17, is reduced in the saturated region.

Figure 17:
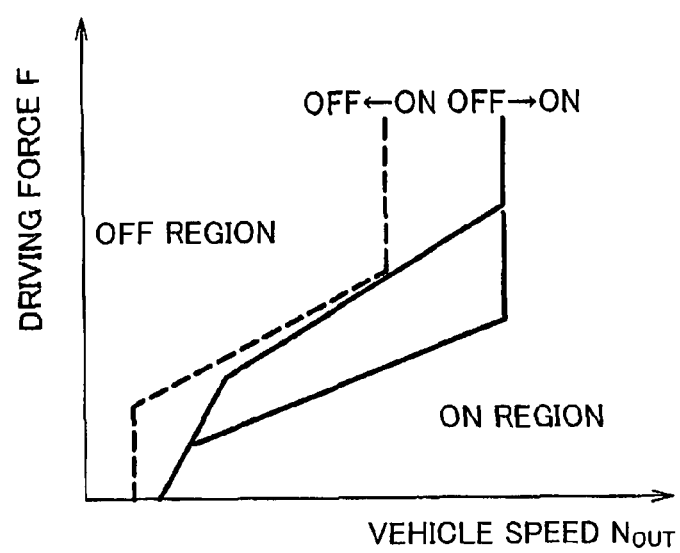
FIG. 17 is a lockup region diagram showing one example in which space between a lockup ON line and a lockup OFF line, which accommodates hysteresis, is reduced due to the saturated region of the engine torque, and, therefore, the lockup ON line is provided with an upper-limit guard and is thus spaced away from the lockup OFF line toward the lower driving force to provide space for hysteresis.

In the sixth embodiment, therefore, the lockup ON line is provided with an upper-limit guard, and is spaced some distance away from the lockup OFF line toward the lower driving-force side to provide space for hysteresis, as indicated by the one-dot chain line in FIG. 17, in order to prevent switching control hunting from occurring between lockup ON determinations and lockup OFF determinations for the lockup clutch 15.

According to the sixth embodiment as described above, when the switching lines in the lockup region diagram having the vehicle speed $N_{OUT}$ and the throttle opening $\theta_{TH}$ as variables are converted into the switching lines in a two-dimensional coordinate system having the vehicle speed $N_{OUT}$ and the driving force F as variables, the lockup ON line is provided with the upper-limit guard so as to ensure space for hysteresis, so that switching control hunting of the lockup clutch 15 is prevented with improved reliability.

Seventh Embodiment

In the first through sixth embodiment as described above, the target driving-force harmonizing unit 106 harmonizes command values in the same unit of driving force F, which are received from a plurality of control systems, such as the driver target driving-force setting unit 100, vehicle posture stability controller 102 and the driving assist system controller 104, so as to set a target driving force F*, and the operating state of the lockup clutch 15 is switched based on the target driving force F* or the target throttle opening $\theta_{TH}^*$ derived from the target driving force F*. The control operations as described above in the illustrated embodiments are intended to prevent switching control hunting that would otherwise occur upon switching of the operating state of the lockup clutch. Namely, in the illustrated embodiments, no matter which of the command values received from the plurality of control systems is selected by the target driving-force harmonizing unit 106, the driving force F* or the target throttle opening $\theta_{TH}$* derived from the target driving force F* is used as a common variable based on which the operating state of the lockup clutch is switched without suffering from switching control hunting.

The seventh embodiment has the same basic construction as the previous embodiments in terms of the driving-force demand control in which the target driving-force harmonizing unit 106 harmonizes the command values in the same or common unit of driving force F obtained through conversion from the plurality of control systems, so as to set a target driving force F*, and engine power control and other controls are performed so as to provide the target driving force F*. In this embodiment, however, switching control hunting is prevented by changing which variable of the target driving force F* and the target throttle opening $\theta_{TH}$* is used for switching of the operating state of the lockup clutch, depending upon which of the command values generated by the control systems is selected by the target driving-force harmonizing unit 106.

Figure 18:
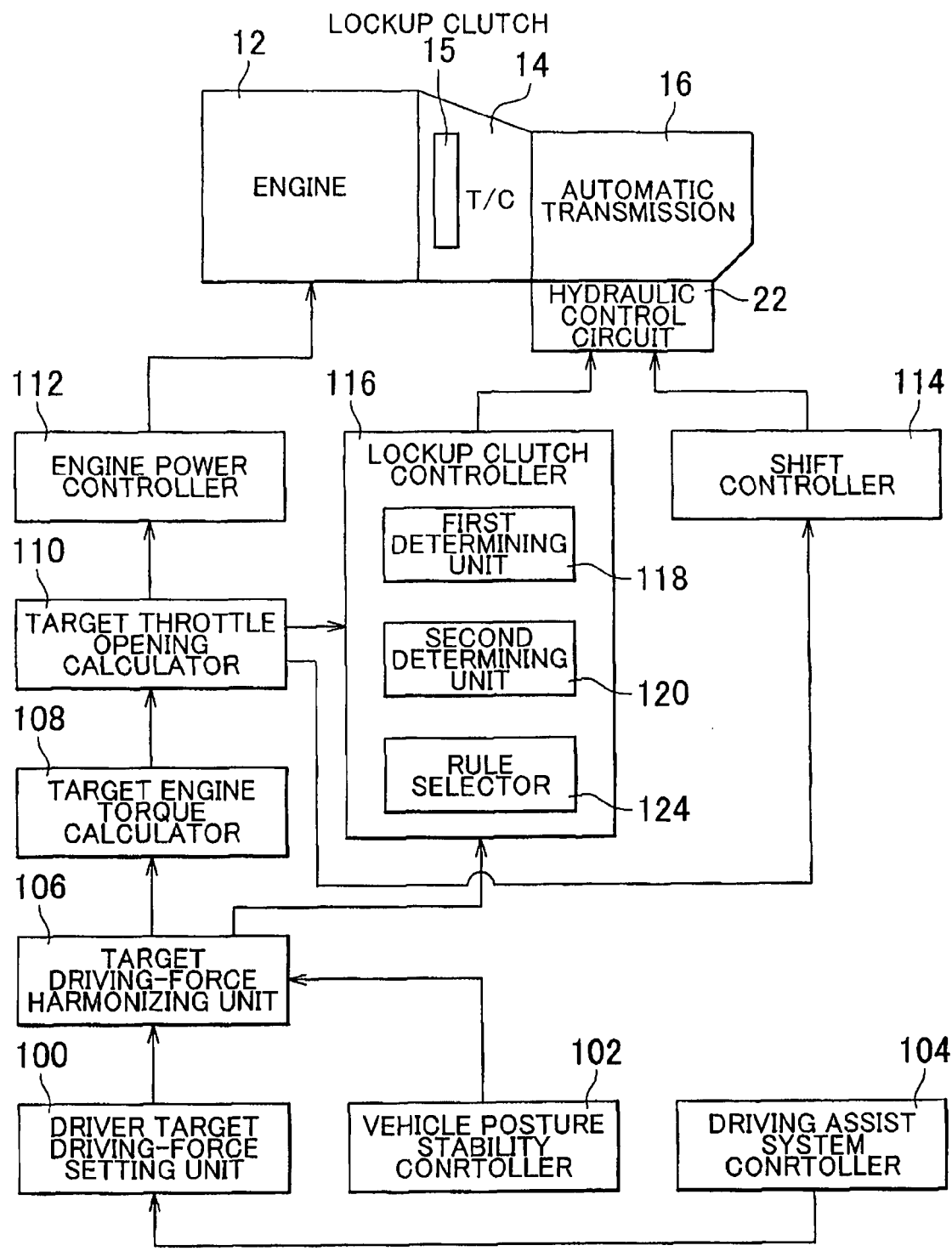
FIG. 18, which corresponds to FIG. 2, is a function block diagram that explains principal control functions of the electronic control unit of FIG. 1 according to a still further embodiment.

FIG. 18, which corresponds to FIG. 2, is a function block diagram that explains principal control functions of the electronic control unit 80. In FIG. 18, setting of the driver target driving force $F_{DIMD}$ by the driver target driving-force setting unit 100 and a means or method for preventing switching control hunting when the lockup clutch controller 116 switches the operating state of the lockup clutch 15 are mainly different from those of the first through sixth embodiments.

Figure 19:
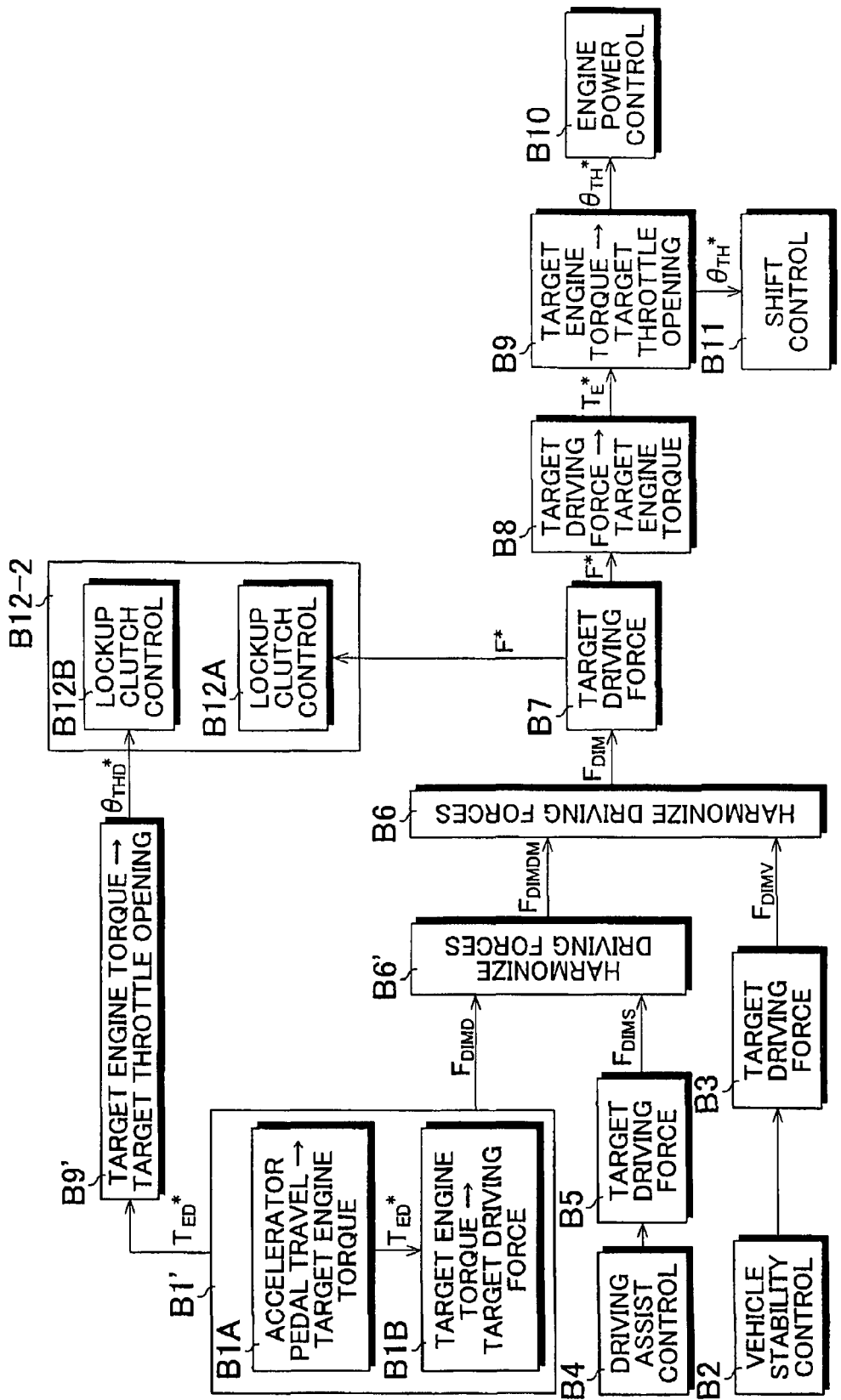
FIG. 19, which corresponds to FIG. 3 or FIG. 11, is a block diagram schematically showing the flow of control of the electronic control unit of FIG. 1, including, for example, setting of a target driving force, calculation of a target throttle opening for use in power control of the engine, power control of the engine, judgment on shifting of the automatic transmission, and judgment on switching of the operating state of the lockup clutch.

FIG. 19, which corresponds to FIG. 3 or FIG. 11, is a block diagram schematically showing the flow of control of the electronic control unit 80, including, for example, setting of the target driving force F*, calculation of the target throttle opening $\theta_{TH}$* for power control of the engine 12, power control of the engine 12, shift judgment for the automatic transmission 16, and judgment on switching of the operating state of the lockup clutch 15. In FIG. 19, blocks B1', B9' and B12-2 are mainly different from block B1, B9 and B12 or B12' of the previous embodiments. In the following description, only the differences from the previous embodiments will be mainly explained with reference to FIG. 18 and FIG. 19.

Figure 20:
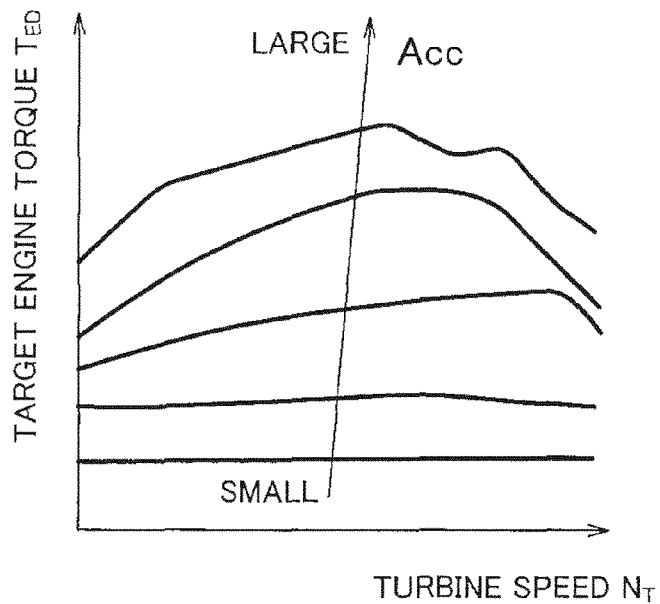
FIG. 20 is an engine map indicating a relationship between the turbine speed and the driver target engine torque with respect to the accelerator pedal travel as a parameter, which was empirically obtained and is stored in advance for setting the driver target engine toque based on the accelerator pedal travel and the turbine speed.

In FIG. 18, the driver target driving-force setting unit 100, which corresponds to block B1' of FIG. 19, includes a portion corresponding to block B1A of FIG. 19, which sets the driver target engine torque $T_{ED}$* based on the actual turbine speed $N_T$ and the accelerator pedal travel $A_{CC}$, from relationships (engine map) between the turbine speed $N_T$ and the driver target engine torque $T_{ED}$* with respect to the accelerator pedal travel $A_{CC}$ as a parameter, as shown in, for example, FIG. 20. The map of FIG. 20 was empirically obtained and is stored in advance in the electronic control unit 80. The driver target driving-force setting unit 100 further includes a portion corresponding to block B1B of FIG. 19, which calculates the driver target driving force $F_{DIMD}$ according to an equation (2) as indicated below, based on the driver target engine torque $T_{ED}$*, gear ratio γ of the automatic transmission 16 that is in the current gear position, reduction gear ratio i of the differential gear unit 70, effective tire radius $r_w$ of the driving wheels 74, power transmission efficiency η, and the torque ratio t of the torque converter 14.

$$F_{DIMD} = T_{ED}* \times \gamma \times i \times \eta \times t / r_w \qquad (2)$$

The target throttle opening calculator 110, which corresponds to block B9' of FIG. 19, calculates the driver target throttle opening $\theta_{THD}$* that provides the driver target engine torque $T_{ED}$* calculated by the driver target driving-force setting unit 100. For example, the target throttle opening calculator 110 calculates a driver target throttle opening $\theta_{THD}$* corresponding to an engine-torque estimated value $T_{E0}$ that provides the driver target engine torque $T_{ED}$*, based on the actual engine speed $N_E$, from a relationship (or map defining a relationship) between the engine speed $N_E$ and the engine-torque estimated value $T_{E0}$ with respect to the throttle opening $\theta_{TH}$ as a parameter, as shown in FIG. 5. The map of FIG. 5, which indicates engine torque characteristics, was empirically obtained and is stored in advance in the electronic control unit 80.

In the case where the target driving-force harmonizing unit 106 sets the vehicle-stability target driving force $F_{DIMV}$ or the driving-assist target driving force $F_{DIMS}$ (i.e., the driver-model target driving force $F_{DIMDM}$ set by the driver target driving-force setting unit 100 when selecting the driving-assist target driving force $F_{DIMS}$) as the target driving force F*, the lockup clutch controller 116, which corresponds to block B12-2 of FIG. 19, switches the operating state of the lockup clutch 15 based on the actual vehicle speed $N_{OUT}$ and the target driving force F* from the lockup region diagram as shown in, for example, FIG. 12. On the other hand, in the case where the target driving-force harmonizing unit 106 sets the driver target driving force $F_{DIMD}$ (i.e., the driver-model target driving force $F_{DIMDM}$ set by the driver target driving-force setting unit 100 when selecting the driver target driving force $F_{DIMD}$) as the target driving force F*, the lockup clutch controller 116 switches the operating state of the lockup clutch 15 based on the actual vehicle speed $N_{OUT}$ and the driver target throttle opening $\theta_{THD}$* calculated by the target throttle opening calculator 110, from the lockup region diagram as shown in, for example, FIG. 7.

More specifically, the lockup clutch controller 116 includes a first determining unit 118 corresponding to block B12A of FIG. 19, and a second determining unit 120 corresponding to block B12B of FIG. 19. The first determining unit 118 determines switching of the operating state of the lockup clutch 15 according to a first rule (or switching condition), based on the actual vehicle speed $N_{OUT}$ and the target driving force F*, from the lockup region diagram of, for example, FIG. 12. The second determining unit 120 determines switching of the operating state of the lockup clutch 15 according to a second rule (or switching condition), based on the actual vehicle speed $N_{OUT}$ and the driver target throttle opening $\theta_{THD}$*, from the lockup region diagram of, for example, FIG. 7. The lockup clutch controller 116 further includes a rule selector 124 that selects a determination made by the first determining unit 118 according to the first rule as an effective determination about switching of the operating state of the lockup clutch 15 when the target driving-force harmonizing unit 106 sets (selects) the vehicle-stability target driving force $F_{DIMV}$ or the driving-assist target driving force $F_{DIMS}$, i.e., a command value from a control system that performs control based on the target driving force $F_{DIM}$, as the target driving force F*. The rule selector 124 selects a determination made by the second determining unit 120 according to the second rule as a determination about switching of the operating state of the lockup clutch 15 when the target driving-force harmonizing unit 106 sets (selects) the driver target driving force $F_{DIMD}$, i.e., a command value from a control system that performs control based on the driver target engine torque $T_{ED}$* (or driver target throttle opening $\theta_{THD}$*), as the target driving force F*. The lockup clutch controller 116 generates a lockup switching command signal to the hydraulic control circuit 22 so that the lockup clutch 15 is switched to the operating state determined by the first determining unit 118 or the second determining unit 120 according to the rule selected by the rule selector 124.

By selecting the lockup region diagram and the target driving force F* or driver target throttle opening $\theta_{THD}$* as a basis of determination about switching of the lockup switch 15, based on a determination made by the target driving-force harmonizing unit 106, a problem of conversion between the target driving force F* and the target throttle opening $\theta_{TH}$* can be avoided, and switching control hunting can be thus prevented. Also, since the operating state of the lockup clutch 15 is switched based on the driver target throttle opening $\theta_{THD}$* when the driver target driving force $F_{DIMD}$ is set as the target driving force F*, the driver's demand for engine power and the operating conditions of the engine 12 are appropriately reflected by the determination about switching of the lockup clutch 15.

In order to correlate the first rule more closely with the second rule to enhance the consistency between the result of determination based on the first rule and the result of determination based on the second rule, the lockup region diagram of FIG. 12 used for the first rule may be plotted by converting the throttle opening $\theta_{TH}$ in the lockup region diagram of FIG. 7 used for the second rule into the driving force F by using, for example, a fixed torque ratio t.

According to the seventh embodiment as described above, when the target driving-force harmonizing unit 106 selects a command value from a control system that performs control based on the target driving force $F_{DIM}$, as the target driving force F*, the rule selector 124 selects a determination made by the first determining unit 118 according to the first rule, based on the actual vehicle speed $N_{OUT}$ and the target driving force F*, from the lockup region diagram as shown in, for example, FIG. 12, as an effective determination about switching of the operating state of the lockup clutch 15. When the target driving-force harmonizing unit 106 selects a command value from a control system that performs control based on the driver target engine torque $T_{ED}$* (or driver target throttle opening $\theta_{THD}$*), as the target driving force F*, on the other hand, the rule selector 124 selects a determination made by the second determining unit 120 according to the second rule, based on the actual vehicle speed $N_{OUT}$ and the driver target throttle opening $\theta_{THD}$*, from the lockup region diagram as shown in, for example, FIG. 7, as an effective determination about switching of the operating state of the lockup clutch 15. This arrangement avoids a problem that the torque ratio t of the torque converter 14 which changes upon switching of the operating state of the lockup clutch 15 is involved in conversion between the target driving force F* and the target throttle opening $\theta_{TH}$* as bases of determination about switching of the operating state of the lockup clutch 15, and thus prevents switching control hunting of the lockup clutch 15.

Also, according to the seventh embodiment, the first rule is established by converting the target throttle opening $\theta_{TH}$* used according to the second rule into the target driving force F*, thus ensuring improved consistency between the result of determination based on the first rule and the result of determination based on the second rule.

While some embodiments of the invention have been described in detail with reference to the drawings, the invention may be otherwise embodied.

In the illustrated embodiments, the lockup clutch controller 116 is arranged to prevent switching control hunting that would occur when the operating state of the lockup clutch 15 is switched between the ON state and the OFF state. In the case where the lockup region diagram as shown in, for example, FIG. 7 or FIG. 12 contains additional switching lines (or boundaries) that define slip regions adjacent to each switching line between the ON region and the OFF region, the control operations of the invention for preventing switching control hunting may be applied to switching of the operating state of the lockup clutch 15 between the ON state and a slipping state or between the OFF state and a slipping state. As examples of control of the slipping state, slip control during acceleration (so-called acceleration flexible control), slip control during starting (so-called flexible start control), or the like, may be considered.

In the illustrated embodiments, the VSC system is employed as an example of system for vehicle posture stability control, and the invention is applied to the case where the VSC system operates. However, the invention may also be applied to the case where other systems than the VSC system operate to stabilize the posture of the vehicle. For example, when the throttle is opened by an excessively large degree upon starting or acceleration on a slippery road surface, and the driving wheels 74 slip due to excessive torque, resulting in deterioration of the starting and acceleration performance or controllability of the vehicle, a system called TRC (Traction Control System) performs control operations for suppressing slipping of the driving wheels 74 by controlling the driving force F or braking force, thereby to provide driving force F suitable for the road conditions and ensure satisfactory starting and acceleration performance, ability of traveling in a straight line and turning stability. The invention may also be applied to the case where the TRC (traction control system) performs the above-described control operations.

While the accelerator pedal 44 is employed as an operating member for adjusting the power of the engine in the illustrated embodiments, any operating member that reflects the driver's demand for a driving-force related value may be employed. For example, the operating member may be in the form of a manually operated lever switch, rotary switch, or the like. It is also possible to provide no operating member, but use voice input for reflecting the driver's demand for the driving-force related value.

While the invention has been described with reference to exemplary embodiments thereof, it is to be understood that the invention is not limited to the embodiments or constructions. To the contrary, the invention is intended to cover various modifications and equivalent arrangements. In addition, while various elements of the embodiments are shown in various combinations and configurations, which are exemplary, other combinations and configurations, including more, less or only a single element, are also within the spirit and scope of the invention.

What is claimed is:

1. A control device of a vehicle including a lockup clutch capable of directly coupling an input and an output of a hydraulic power transmitting device disposed in a power transmission path that extends from a power source to driving wheels, the control device being adapted to switch the lockup clutch to an operating state that is determined from predetermined switching lines, based on vehicle conditions, comprising:

a first determining unit that determines switching of the operating state of the lockup clutch from switching lines plotted based on a first torque ratio of the hydraulic power transmitting device which is established when the lockup clutch is in an engaged state;

a second determining unit that determines switching of the operating state of the lockup clutch from switching lines plotted based on a second torque ratio of the hydraulic power transmitting device which is established when the lockup clutch is in a released state; and a switching determination selector that is operable, when one of the first and second determining units determines switching of the operating state of the lockup clutch, to select a determination made by the other determining unit as an effective determination about switching of the operating state of the lockup clutch once the other determining unit determines the same switching of the operating state as that determined by said one of the first and second determining units.

2. The control device as defined in claim 1, wherein the predetermined switching lines comprise a lockup ON line used for determining switching of the lockup clutch from the released state to the engaged state, and a lockup OFF line used for determining switching of the lockup clutch from the engaged state to the released state, and the lockup ON line and the lockup OFF line are separated by a space.

3. A control device of a vehicle including a lockup clutch capable of directly coupling an input and an output of a hydraulic power transmitting device disposed in a power transmission path that extends from a power source to driving wheels, the control device being adapted to switch the lockup clutch to an operating state that is determined from predetermined switching lines, based on vehicle conditions, comprising:

a target driving-force setting unit that sets a target driving force for the vehicle;

a target load calculator that calculates a target load of the power source, based on the target driving-force set by the target driving-force setting unit, and the target load calculated based on a first torque ratio of the hydraulic power transmitting device which is established when the lockup clutch is in an engaged state being a first target load, and the target load calculated based on a second torque ratio of the hydraulic power transmitting device which is established when the lockup clutch is in a released state being a second target load;

a first determining unit that determines switching of the operating state of the lockup clutch, using the first target load;

a second determining unit that determines switching of the operating state of the lockup clutch, using the second target load; and a switching determination selector that is operable, when one of the first and second determining units determines switching of the operating state of the lockup clutch, to select a determination made by the other determining unit as an effective determination about switching of the operating state of the lockup clutch once the other determining unit determines the same switching of the operating state as that determined by said one of the first and second determining units.

4. The control device as defined in claim 3, wherein:

the first determining unit determines switching of the operating state of the lockup clutch based on first switching lines plotted based on vehicle conditions represented by the first target load and a vehicle speed, and the second determining unit determines switching of the operating state of the lockup clutch based on second switching lines plotted based on vehicle conditions represented by the second target load and the vehicle speed.

5. The control device as defined in claim 4, wherein at least one of the first and second switching lines are a lockup ON line used for determining switching of the lockup clutch from the released state to the engaged state, and a lockup OFF line used for determining switching of the lockup clutch from the engaged state to the released state, and the lockup ON line and the lockup OFF line are separated by a space.

6. The control device as defined in claim 4, wherein the vehicle speed is determined based on a vehicle-speed related value.

7. The control device as defined in claim 3, wherein the target driving force is determined based on a target driving-force related value.

8. The control device as defined as in claim 3, wherein the target load is determined based on a target load related value.

9. The control device as defined as in claim 3, wherein the target load is a target throttle opening.

10. A control device of a vehicle including a lockup clutch capable of directly coupling an input and an output of a hydraulic power transmitting device disposed in a power transmission path that extends from a power source to driving wheels, the control device being adapted to switch the lockup clutch to an operating state that is determined according to a predetermined rule, comprising:

a harmonizing unit that harmonizes plural target driving forces for the vehicle, to select a target driving-force for use in control of the lockup clutch, said target driving-force being derived from command values produced by a plurality of control systems; and a rule selector that has a first rule according to which switching of the operating state of the lockup clutch is determined based on the target driving-force, and a second rule according to which switching of the operating state of the lockup clutch is determined based on a target load of the power source; and that selects a determination made according to the first rule as an effective determination about switching of the operating state of the lockup clutch when the harmonizing unit selects a command value from a control system as one of said plurality of control systems which performs control based on the target driving-force, and selects a determination made according to the second rule as an effective determination about switching of the operating state of the lockup clutch when the harmonizing unit selects a command value from a control system as one of said plurality of control systems which performs control based on the target load of the power source.

11. The control device as defined in claim 10, wherein the target driving-force used according to the first rule is derived through conversion from the target load used according to the second rule.

12. The control device as defined in claim 10, wherein the target driving force is determined based on a target driving force related value.

13. The control device as defined in claim 10, wherein the target load is determined based on a target load related value.

14. The control device as defined in claim 10, wherein the target load is a target throttle opening.

15. A method of controlling a vehicle including a lockup clutch capable of directly coupling an input and an output of a hydraulic power transmitting device disposed in a power transmission path that extends from a power source to driving wheels, wherein the lockup clutch is switched to an operating state that is determined from predetermined switching lines, based on vehicle conditions, comprising the steps of:

determining switching of the operating state of the lockup clutch from a first switching lines plotted based on a lockup-ON torque ratio of the hydraulic power transmitting device which is established when the lockup clutch is in an engaged state;

determining switching of the operating state of the lockup clutch from a second switching lines plotted based on a lockup-OFF torque ratio of the hydraulic power transmitting device which is established when the lockup clutch is in a released state; and when switching of the operating state of the lockup clutch is determined from one of the first switching lines and second switching lines, selecting a determination using the other of the first switching lines and second switching lines as an effective determination about switching of the operating state of the lockup clutch once the same switching of the operating state as that determined with said one of the first switching lines and second switching lines is determined with the other of the first switching lines and the second switching lines.

16. A method of controlling a vehicle including a lockup clutch capable of directly coupling an input and an output of a hydraulic power transmitting device disposed in a power transmission path that extends from a power source to driving wheels, wherein the lockup clutch is switched to an operating state that is determined from predetermined switching lines, based on vehicle conditions, comprising the steps of:

setting a target driving force for the vehicle;

calculating a target load of the power source, based on the target driving-force, and the target load calculated based on a lockup-ON torque ratio of the hydraulic power transmitting device which is established when the lockup clutch is in an engaged state being a first target load and the target load calculated based on a lockup-OFF torque ratio of the hydraulic power transmitting device which is established when the lockup clutch is in a released state being a second target load;

determining switching of the operating state of the lockup clutch, using the first target load;

determining switching of the operating state of the lockup clutch, using the second target load; and when switching of the operating state of the lockup clutch is determined using the target load corresponding to one of the lockup-ON torque ratio and the lockup-OFF torque ratio, selecting a determination using the target load corresponding to the other of the lockup-ON torque ratio and the lockup-OFF torque ratio as an effective determination about switching of the operating state of the lockup clutch once the same switching of the operating state as that determined using the target load corresponding to said one of the lockup-ON torque ratio and the lockup-OFF torque ratio is determined using the target load corresponding to the other of the lockup-ON torque ratio and the lockup-OFF torque ratio.

17. The method as defined in claim 16, wherein the step of determining switching of the operating state of the lockup clutch based on the first target load includes a step of determining switching of the operating state of the lockup clutch using a first switching lines plotted based on vehicle conditions represented by the first target load and a vehicle speed, and the step of determining switching of the operating state of the lockup clutch based on the second target load includes a step of determining switching of the operating state of the lockup clutch using a second switching lines plotted based on vehicle conditions represented by the second target load and the vehicle speed.

18. A method of controlling a vehicle including a lockup clutch capable of directly coupling an input and an output of a hydraulic power transmitting device disposed in a power transmission path that extends from a power source to driving wheels, wherein the lockup clutch is switched to an operating state that is determined according to a predetermined rule, comprising the steps of:

harmonizing plural target driving-forces of the vehicle, so as to select a target driving-force for use in control of the lockup clutch, said target driving-force being derived from command values produced by a plurality of control systems;

determining switching of the operating state of the lockup clutch according to a first rule, based on the target driving-force;

determining switching of the operating state of the lockup clutch according to a second rule, based on a target load of the power source; and selecting a determination made according to the first rule as an effective determination about switching of the operating state of the lockup clutch when the target driving-force for use in control of the lockup clutch is derived from a command value from a control system as one of said plurality of control systems which performs control based on the target driving-force, and selecting a determination made according to the second rule as an effective determination about switching of the operating state of the lockup clutch when the target driving-force for use in control of the lockup clutch is derived from a command value from a control system as one of said plurality of control systems which performs control based on the target load of the power source.

19. The method as defined in claim 18, wherein the target driving-force used according to the first rule is derived through conversion from the target load used according to the second rule.

* * * * *